United States Patent
Guan et al.

(10) Patent No.: US 12,045,768 B2
(45) Date of Patent: Jul. 23, 2024

(54) UNMANNED DELIVERY DEVICE, DELIVERY ROBOT DISPATCHING METHOD, AND ELECTRONIC DEVICE

(71) Applicant: Rajax Network Technology (Shanghai) Co., Ltd., Shanghai (CN)

(72) Inventors: Zhijun Guan, Shanghai (CN); Wei Chen, Shanghai (CN); Xu Liu, Shanghai (CN); Jiqiang Fan, Shanghai (CN)

(73) Assignee: RAJAX NETWORK TECHNOLOGY (SHANGHAI) CO., LTD., Shanghai (CN)

( * ) Notice: Subject to any disclaimer, the term of this patent is extended or adjusted under 35 U.S.C. 154(b) by 165 days.

(21) Appl. No.: 17/599,046

(22) PCT Filed: Feb. 27, 2020

(86) PCT No.: PCT/CN2020/076893
§ 371 (c)(1),
(2) Date: Sep. 28, 2021

(87) PCT Pub. No.: WO2020/199801
PCT Pub. Date: Oct. 8, 2020

(65) Prior Publication Data
US 2022/0180312 A1 Jun. 9, 2022

(30) Foreign Application Priority Data
Mar. 29, 2019 (CN) .......................... 201910253089.5

(51) Int. Cl.
*G06Q 10/0836* (2023.01)
*B65G 1/137* (2006.01)
*G05D 1/00* (2006.01)

(52) U.S. Cl.
CPC ......... *G06Q 10/0836* (2013.01); *B65G 1/137* (2013.01); *G05D 1/0225* (2013.01)

(58) Field of Classification Search
CPC ..... G06Q 20/203; G06Q 50/28; G06Q 10/087
See application file for complete search history.

(56) References Cited

U.S. PATENT DOCUMENTS

| 10,087,002 B2 | 10/2018 | Shields et al. |
| 2018/0197137 A1 | 7/2018 | High et al. |

(Continued)

FOREIGN PATENT DOCUMENTS

| CN | 204872685 U | 12/2015 |
| CN | 106200677 A | 12/2016 |

(Continued)

OTHER PUBLICATIONS

Christoph Roser; "Delivery Sequences: FIFO, LIFO, and Others" Feb. 19, 2019; https://www.allaboutlean.com/fifo-lifo-etc/ (Year: 2019).*

(Continued)

*Primary Examiner* — Rupangini Singh
*Assistant Examiner* — David G. Godbold
(74) *Attorney, Agent, or Firm* — Getech Law LLC; Jun Ye

(57) ABSTRACT

The embodiments of the present disclosure relate to an unmanned delivery device, a delivery robot dispatching method, and an electronic device. The unmanned delivery device includes a container body, M delivery robots and a transfer module. The container body is provided with M cabinet groups and each of the cabinet groups is used to store goods to be delivered by a corresponding delivery robot. The container body is configured to identify a target delivery robot, determine order information of target goods stored in a target cabinet group corresponding to the target delivery (Continued)

robot, and instruct the target delivery robot to deliver the target goods according to the order information. The transfer module is used to move the target goods stored in the target cabinet group corresponding to the target delivery robot to the target delivery robot.

10 Claims, 7 Drawing Sheets

(56) References Cited

U.S. PATENT DOCUMENTS

| | | | | |
|---|---|---|---|---|
| 2018/0365641 | A1* | 12/2018 | Zhu | G06K 7/1417 |
| 2019/0062052 | A1* | 2/2019 | Sands | B65G 1/1371 |
| 2019/0168392 | A1* | 6/2019 | Väin | B65G 1/0407 |
| 2020/0207250 | A1* | 7/2020 | Jarvis | G01C 21/3623 |

FOREIGN PATENT DOCUMENTS

| | | |
|---|---|---|
| CN | 107621827 A | 1/2018 |
| CN | 108364143 A | 8/2018 |
| CN | 108621150 A | 10/2018 |
| CN | 109081035 A | 12/2018 |
| CN | 109205157 A | 1/2019 |
| CN | 109911489 A | 6/2019 |
| JP | H0988483 A | 3/1997 |

OTHER PUBLICATIONS

State Intellectual Property Office of the People's Republic of China, Office Action and Search Report Issued in Application No. 2019102530895, Nov. 15, 2019, 18 pages. (Submitted with Machine/Partial Translation).

State Intellectual Property Office of the People's Republic of China, Office Action and Search Report Issued in Application No. 2019102530895, Feb. 27, 2020, 17 pages. (Submitted with Machine/Partial Translation).

ISA State Intellectual Property Office of the People's Republic of China, Written Opinion of the International Searching Authority Issued in Application No. PCT/CN2020/076893 Jun. 2, 2020, WIPO, 6 pages. (Submitted with Machine/Partial Translation).

ISA State Intellectual Property Office of the People's Republic of China, International Search Report Issued in Application No. PCT/CN2020/076893, Jun. 2, 2020, WIPO, 4 pages.

* cited by examiner

UNMANNED DELIVERY DEVICE, DELIVERY ROBOT DISPATCHING METHOD, AND ELECTRONIC DEVICE

CROSS-REFERENCE TO RELATED APPLICATIONS

This disclosure is the U.S. National Phase of PCT International Application No. PCT/CN2020/076893 filed on Feb. 27, 2020, which claims priority to Chinese Patent Application No. 201910253089.5, filed on Mar. 29, 2019, the disclosure of which is incorporated herein by reference in its entirety.

TECHNICAL FIELD

The present disclosure relates to the field of terminal control technology, and in particular, to unmanned delivery devices, delivery robot dispatching methods and electronic devices.

BACKGROUND

With the rapid development of Internet technology, the Internet has long become an indispensable part of modern people's daily life. Due to its unique convenience and intuitiveness, online shopping makes more and more users choose to solve the problems of daily shopping through online shopping. The goods can be any items such as food, sanitary products, clothing, etc.

At present, the common form is that users place orders on APP through user terminals, such as computers and mobile phones. After receiving an order, the merchant prepares the goods, packs the goods, and delivers the packed goods to the logistics personnel, and finally the logistics deliverer delivers the goods to the user.

SUMMARY

The embodiments of the present disclosure provide an unmanned delivery device, a delivery robot dispatching method, a delivery robot dispatching apparatus, an electronic device, and a computer-readable storage medium.

In the first aspect, an embodiment of the present disclosure provides an unmanned delivery device. Specifically, the unmanned delivery device includes a container body, M delivery robots, and a transfer module, the M delivery robots and the transfer module are connected to the container body, and the container body is provided with M cabinet groups respectively corresponding to the M delivery robots, and the M is an integer greater than or equal to 1; each of cabinet groups is used for storing at least one goods to be delivered by the corresponding delivery robot; the container body is configured to identify the target delivery robot, determine the order information of the target goods stored in the target cabinet group corresponding to the target delivery robot, and instruct the target delivery robot to deliver the target goods according to the order information, wherein the order information includes the delivery address of the target goods, and the target delivery robot is any one of the M delivery robots; the transfer module is used for moving the target goods stored in the target cabinet group corresponding to the target delivery robot to the target delivery robot.

With reference to the first aspect, in the first implementation of the first aspect of the present disclosure, the container body is also provided with at least one receiving bin; the receiving bin is used for temporarily storing the to-be-delivered goods; the container body is configured to determine the delivery robot for delivering the to-be-delivered goods stored in the receiving bin; the transfer module is also used for moving the to-be-delivered goods stored in the receiving bin to the cabinet group corresponding to the delivery robot for delivering the to-be-delivered goods.

With reference to the first aspect and the implementation above, in the second implementation of the first aspect of the present disclosure, the cabinet group includes various cabinets for storing to-be-delivered goods with different characteristics, the characteristic includes at least one of a transportation characteristic and a dimensional characteristic of the to-be-delivered goods; the container body is also configured to determine the cabinet for storing the to-be-delivered goods from the cabinet group corresponding to the delivery robot for delivering the to-be-delivered goods according to the characteristic of the to-be-delivered goods stored in the receiving bin; the transfer module is also used for moving the to-be-delivered goods stored in the receiving bin to the cabinet determined by the container body.

With reference to the first aspect and the implementation above, in the third implementation of the first aspect of the present disclosure, each of the cabinet groups includes at least one cabinet.

With reference to the first aspect and the implementation above, in the fourth implementation of the first aspect of the present disclosure, the container body is also configured to determine target goods currently to be delivered by the target delivery robot from the to-be-delivered goods stored in the at least one cabinet included in the target cabinet group.

With reference to the first aspect and the implementation above, in the fifth implementation of the first aspect of the present disclosure, the target delivery robot is provided with a goods storage bin; the transfer module is also used for moving the target goods stored in the target cabinet group to the goods storage bin of the target delivery robot.

With reference to the first aspect and the implementation above, in the sixth implementation of the first aspect of the present disclosure, the container body is connected to each of the M delivery robots through wireless communication.

In the second aspect, an embodiment of the present disclosure provides a delivery robot dispatching method, applied to the container body of any embodiment of the first aspect. Specifically, the delivery robot dispatching method includes: identifying the target delivery robot, and determining the target cabinet group corresponding to the target delivery robot; obtaining the order information of the target goods stored in the target cabinet group, and the target delivery robot is any one of the M delivery robots; sending a delivery instruction to the target delivery robot according to the order information of the target goods, so that the target delivery robot delivers the target goods according to the order information after obtaining the target goods.

With reference to the second aspect, in the first implementation of the second aspect of the present disclosure, before obtaining the order information of the target goods stored in the target cabinet group, the method also includes: determining the target goods from the to-be-delivered goods stored in the at least one cabinet included in the target cabinet group.

With reference to the second aspect and the implementation above, in the second implementation of the second aspect of the present disclosure, determining the target goods from the to-be-delivered goods stored in the at least one cabinet included in the target cabinet group includes: obtaining the storage time of the to-be-delivered goods stored in each of the at least one cabinet included in the target cabinet group, and the storage time indicates a time of the to-be-delivered goods being stored in the cabinet; determining the target goods currently to be delivered by the target delivery robot from the to-be-delivered goods stored in the at least one cabinet according to the storage time of the to-be-delivered goods stored in each of cabinets.

With reference to the second aspect and the implementation above, in the third implementation of the second aspect of the present disclosure, determining the target goods from the to-be-delivered goods stored in the at least one cabinet included in the target cabinet group includes: obtaining the remaining delivery time of the to-be-delivered goods stored in each of the at least one cabinet included in the target cabinet group, and the remaining delivery time indicates a time difference from a current time to a scheduled delivery time of the to-be-delivered goods; determining the target goods currently to be delivered by the target delivery robot from the to-be-delivered goods stored in the at least one cabinet according to the remaining delivery time of the to-be-delivered goods stored in each of cabinets.

With reference to the second aspect and the implementation above, in the fourth implementation of the second aspect of the present disclosure, the unmanned delivery device also includes a transfer module, after determining the target goods, the method also includes: transferring the target goods to the target delivery robot automatically through the transfer module.

With reference to the second aspect and the implementation above, in the fifth implementation of the second aspect of the present disclosure, before identifying the target delivery robot, the method also includes: obtaining the order information of the first to-be-delivered goods, and determining the first delivery robot for delivering the first to-be-delivered goods from the M delivery robots according to the order information of the first to-be-delivered goods; moving the first to-be-delivered goods to the first cabinet group corresponding to the first delivery robot for storage, and saving a correspondence between the order information of the first to-be-delivered goods and the first cabinet group.

With reference to the second aspect and the implementation above, in the sixth implementation of the second aspect of the present disclosure, the cabinet group includes various cabinets for storing to-be-delivered goods with different characteristics, moving the first to-be-delivered goods to the first cabinet group corresponding to the first delivery robot for storage, and saving the correspondence between the order information of the first to-be-delivered goods and the first cabinet group includes: determining the characteristic of the first to-be-delivered goods based on the order information of the first to-be-delivered goods, and the characteristic includes a transportation characteristic or a dimensional characteristic of the first to-be-delivered goods; determining the first cabinet for storing the first to-be-delivered goods from the at least one cabinet included in the first cabinet group according to the characteristic of the first to-be-delivered goods; moving the first to-be-delivered goods to the first cabinet included in the first cabinet group for storage, and saving the correspondence between the order information of the first to-be-delivered goods and the first cabinet.

With reference to the second aspect and the implementation above, in the seventh implementation of the second aspect of the present disclosure, the method also includes: beginning to record the storage time of the first to-be-delivered goods stored in the first cabinet when detecting that the first to-be-delivered goods are placed in the first cabinet.

With reference to the second aspect and the implementation above, in the eighth implementation of the second aspect of the present disclosure, the method also includes: obtaining the remaining delivery time of the first to-be-delivered goods; updating the remaining delivery time of the first to-be-delivered goods in real time after detecting that the first to-be-delivered goods are placed in the first cabinet.

With reference to the second aspect and the implementation above, in the ninth implementation of the second aspect of the present disclosure, the container body is also provided with at least one receiving bin, and the receiving bin is used for temporarily storing the to-be-delivered goods; after obtaining the order information of the first to-be-delivered goods, the method also includes: determining the first receiving bin for temporarily storing the first to-be-delivered goods from the at least one receiving bin according to the order information of the first to-be-delivered goods; after detecting that the first to-be-delivered goods are placed in the first receiving bin, performing the steps of determining the first delivery robot for delivering the first to-be-delivered goods from the M delivery robots according to the order information of the first to-be-delivered goods.

In the third aspect, an embodiment of the present disclosure provides a delivery robot dispatching method applied to the target delivery robot of any embodiment of the first aspect. Specifically, the delivery robot dispatching method includes: receiving, from the container body, the delivery instruction including order information of the target goods to be delivered; delivering the target goods according to the order information when determining that the target goods are obtained.

With reference to the third aspect, in the first implementation of the third aspect of the present disclosure, the method also includes: receiving the target goods carried by the transfer module cooperating with the container body.

In the fourth aspect, an embodiment of the present disclosure provides a delivery robot dispatching apparatus provided in the container body of any embodiment of the first aspect. Specifically, the delivery robot dispatching apparatus includes: a first identifying module configured to identify a target delivery robot, and determine a target cabinet group corresponding to the target delivery robot; a first obtaining module configured to obtain the order information of the target goods stored in the target cabinet group, and the target delivery robot is any one of the M delivery robots; a first sending module configured to send a delivery instruction to the target delivery robot according to the order information of the target goods, so that the target delivery robot delivers the target goods according to the order information after obtaining the target goods.

With reference to the fourth aspect, in the first implementation of the fourth aspect of the present disclosure, the apparatus also includes: a first determining module configured to determine the target goods from the to-be-delivered goods stored in the at least one cabinet included in the target cabinet group.

With reference to the fourth aspect and the implementation above, in the second implementation of the fourth aspect of the present disclosure, the first determining module includes: a first obtaining sub-module configured to obtain the storage time of the to-be-delivered goods stored in each of the at least one cabinet included in the target cabinet group, and the storage time indicates a time of the to-be-delivered goods being stored in the cabinet; a second obtaining sub-module configured to determine the target goods currently to be delivered by the target delivery robot from the to-be-delivered goods stored in the at least one cabinet according to the storage time of the to-be-delivered goods stored in each of the cabinets.

With reference to the fourth aspect and the implementation above, in the third implementation of the fourth aspect of the present disclosure, the first determining module is configured to include: a third obtaining sub-module configured to obtain the remaining delivery time of the to-be-delivered goods stored in each of the at least one cabinet included in the target cabinet group, and the remaining delivery time indicates a time difference from a current time to a scheduled delivery time of the to-be-delivered goods; a fourth determining sub-module configured to determine the target goods currently to be delivered by the target delivery robot from the to-be-delivered goods stored in the at least one cabinet according to the remaining delivery time of the to-be-delivered goods stored in each of the cabinets.

With reference to the fourth aspect and the implementation above, in the fourth implementation of the fourth aspect of the present disclosure, the unmanned delivery device also includes a transfer module, the apparatus also includes: a first transferring module configured to automatically transfer the target goods to the target delivery robot through the transfer module.

With reference to the fourth aspect and the implementation above, in the fifth implementation of the fourth aspect of the present disclosure, the apparatus also includes: a second obtaining module configured to obtain the order information of the first to-be-delivered goods, and determine the first delivery robot for delivering the first to-be-delivered goods from the M delivery robots according to the order information of the first to-be-delivered goods; a moving and saving module configured to move the first to-be-delivered goods to the first cabinet group corresponding to the first delivery robot for storage, and save the correspondence between the order information of the first to-be-delivered goods and the first cabinet group.

With reference to the fourth aspect and the implementation above, in the sixth implementation of the fourth aspect of the present disclosure, the cabinet group includes various cabinets for storing to-be-delivered goods with different characteristics, the moving and saving module includes: a first determining sub-module configured to determine the characteristic of the first to-be-delivered goods based on the order information of the first to-be-delivered goods, and the characteristic include a the transportation characteristic or a dimensional characteristic of the first to-be-delivered goods; a second determining sub-module configured to determine the first cabinet for storing the first to-be-delivered goods from the at least one cabinet included in the first cabinet group according to the characteristic of the first to-be-delivered goods; a moving and saving sub-module configured to move the first to-be-delivered goods to the first cabinet included in the first cabinet group for storage, and save the correspondence between the order information of the first to-be-delivered goods and the first cabinet.

With reference to the fourth aspect and the implementation above, in the seventh implementation of the fourth aspect of the present disclosure, the apparatus also includes: a recording module configured to begin to record the storage time of the first to-be-delivered goods stored in the first cabinet when detecting that the first to-be-delivered goods are placed in the first cabinet.

With reference to the fourth aspect and the implementation above, in the eighth implementation of the fourth aspect of the present disclosure, the apparatus also includes: a third obtaining module configured to obtain the remaining delivery time of the first to-be-delivered goods; a updating module configured to update the remaining delivery time of the first to-be-delivered goods in real time after detecting that the first to-be-delivered goods are placed in the first cabinet.

With reference to the fourth aspect and the implementation above, in the ninth implementation of the fourth aspect of the present disclosure, the container body is also provided with at least one receiving bin, and the receiving bin is configured to temporarily store the to-be-delivered goods; the apparatus also includes: a fourth obtaining module configured to determine the first receiving bin for temporarily storing the first to-be-delivered goods from the at least one receiving bin according to the order information of the first to-be-delivered goods; a detecting module configured to perform the step configured in the second obtaining module when detecting that the first to-be-delivered goods are placed in the first receiving bin.

In the fifth aspect, an embodiment of the present disclosure provides delivery robot dispatching apparatus provided in the target delivery robot of any embodiment of the first aspect. Specifically, the delivery robot dispatching apparatus includes: a first receiving module configured to receive a delivery instruction sent by the container body, and the delivery instruction includes the order information of the target goods to be delivered; a first delivering module configured to deliver the target goods according to the order information when determining that the target goods are obtained.

With reference to the fifth aspect, in the first implementation of the fifth aspect of the present disclosure, the apparatus also includes: a second receiving module configured to receive the target goods carried by the transfer module cooperating with the container body.

In the sixth and seventh aspects, the embodiments of the present disclosure provide an electronic device, including a memory configured to store one or more computer instructions supporting the delivery robot dispatching apparatus to execute the delivery robot dispatching in the second and third aspects respectively, and a processor configured to execute the computer instructions stored in the memory. The delivery robot dispatching apparatus may also include a communication interface configured to communicate with other device or a communication network.

In the eighth and ninth aspects, the embodiments of the present disclosure provide a computer-readable storage medium for storing computer instructions used by the delivery robot dispatching apparatus, which includes computer instructions for executing the delivery robot dispatching methods respectively recited in the second and third aspects.

The technical solutions provided by the embodiments of the present disclosure may include the following beneficial effects: In the above-mentioned technical solutions, the container body can store a plurality of goods to be delivered by the target delivery robot in the target cabinet group corresponding to the target delivery robot, and when the target delivery robot is idle, determine target goods currently to be delivered by the target delivery robot from the to-be-delivered goods stored in the cabinet group, and then instruct the target delivery robot to deliver the target goods. It avoids the situation that when the target delivery robot is busy, a deliverer needs to wait until the target delivery robot is idle so as to hand over the to-be-delivered goods to the target delivery robot, and thus the waiting time of the deliverer is shortened, and the goods delivery efficiency is improved.

In the tenth aspect, an embodiment of the present disclosure provides an unmanned delivery device. Specifically, the unmanned delivery device includes a container body, M delivery robots, and a transfer module. The M delivery robots and the transfer module are connected to the container body. The container body is provided with at least one receiving bin, the M is an integer greater than or equal to 1. Each of the receiving bins is used for temporarily storing goods to be delivered by the M delivery robots. The container body is configured to identify the target delivery robot, determine order information of target goods that are to be delivered by the target delivery robot and temporarily stored in the receiving bin, and instruct the target delivery robot to deliver the target goods according to the order information, wherein the order information includes a delivery address of the target goods, and the target delivery robot is any one of the M delivery robots. The transfer module is used for moving the target goods temporarily stored in the receiving bin to the target delivery robot.

With reference to the tenth aspect, in the first implementation of the tenth aspect of the present disclosure, the container body is also configured to determine the target goods currently to be delivered by the target delivery robot from the to-be-delivered goods temporarily stored in the at least one receiving bin.

With reference to the tenth aspect and the implementation above, in the second implementation of the tenth aspect of the present disclosure, the target delivery robot is provided with a goods storage bin; the transfer module is also used for moving the target goods stored in the receiving bin to the goods storage bin of the target delivery robot.

With reference to the tenth aspect and the implementation above, in the third implementation of the tenth aspect of the present disclosure, the container body is connected to each of the M delivery robots through wireless communication.

In the eleventh aspect, an embodiment of the present disclosure provides a delivery robot dispatching method applied to the container body of any one of the embodiments in the tenth aspect. Specifically, the delivery robot dispatching method includes: identifying a target delivery robot; obtaining order information of target goods that are to be delivered by the target delivery robot and temporarily stored in the receiving bin, and the target delivery robot is any one of the M delivery robots, the order information includes an delivery address of the target goods; sending a delivery instruction to the target delivery robot according to the order information, so that the target delivery robot delivers the target goods according to the order information after obtaining the target goods.

With reference to the eleventh aspect, in the first implementation of the eleventh aspect of the present disclosure, before obtaining the order information of the target goods that are to be delivered by the target delivery robot and temporarily stored in the receiving bin, the method also includes: determining the target goods currently to be delivered by the target delivery robot from the to-be-delivered goods temporarily stored in the at least one receiving bin.

With reference to the eleventh aspect and the implementation above, in the second implementation of the eleventh aspect of the present disclosure, determining the target goods currently to be delivered by the target delivery robot from the to-be-delivered goods temporarily stored in the at least one receiving bin, including: obtaining the storage time of the to-be-delivered goods temporarily stored in each of the at least one receiving bin, and the storage time indicates a time of the to-be-delivered goods being stored in the receiving bin; determining the target goods currently to be delivered by the target delivery robot from the to-be-delivered goods temporarily stored in the at least one receiving bin according to the storage time of the to-be-delivered goods temporarily stored in each of the at least one receiving bin.

With reference to the eleventh aspect and the implementation above, in the third implementation of the eleventh aspect of the present disclosure, determining the target goods currently to be delivered by the target delivery robot from the to-be-delivered goods temporarily stored in the at least one receiving bin, including: obtaining the remaining delivery time of the to-be-delivered goods temporarily stored in each of the at least one receiving bin, and the remaining delivery time indicates a time difference from a current time to a scheduled delivery time of the to-be-delivered goods; determining the target goods currently to be delivered by the target delivery robot from the to-be-delivered goods temporarily stored in the at least one receiving bin according to the remaining delivery time of the to-be-delivered goods temporarily stored in each of the at least one receiving bin.

With reference to the eleventh aspect and the implementation above, in the fourth implementation of the eleventh aspect of the present disclosure, the unmanned delivery device also includes a transfer module, after determining the target goods, the method also includes: transferring the target goods to the target delivery robot automatically through the transfer module.

In the twelfth aspect, an embodiment of the present disclosure provides a delivery robot dispatching method applied to the target delivery robot of any one of the embodiments in the tenth aspect. Specifically, the delivery robot dispatching method includes: receiving, from the container body, the delivery instruction including order information of the target goods to be delivered; delivering the target goods according to the order information when determining that the target goods are obtained.

With reference to the twelfth aspect, in the first implementation of the twelfth aspect of the present disclosure, the method also includes: receiving the target goods carried by the transfer module cooperating with the container body.

In the thirteenth aspect, an embodiment of the present disclosure provides a delivery robot dispatching apparatus provided in the container body of any one of the embodiments in the tenth aspect. Specifically, the delivery robot dispatching apparatus includes: a second identifying module configured to identify the target delivery robot; a fifth obtaining module configured to obtain order information of target goods that are temporarily stored in the receiving bin and to be delivered by the target delivery robot, and the target delivery robot is any one of the M delivery robots, and the order information includes the delivery address of the target goods; a second sending module configured to send a delivery instruction to the target delivery robot according to the order information, and the delivery instruction includes the order information of the target goods, so that the target delivery robot delivers the target goods according to the order information after obtaining the target goods.

With reference to the thirteenth aspect, in the first implementation of the thirteenth aspect of the present disclosure, the apparatus also includes: a second determining module configured to determine the target goods currently to be delivered by the target delivery robot from the to-be-delivered goods temporarily stored in the at least one receiving bin.

With reference to the thirteenth aspect and the implementation above, in the second implementation of the thirteenth aspect of the present disclosure, the second determining module includes: a fifth obtaining sub-module configured to obtain the storage time of the to-be-delivered goods temporarily stored in each of the at least one receiving bin, and the storage time indicates a time of the to-be-delivered goods being stored in the receiving bin; a sixth obtaining sub-module configured to determine the target goods currently to be delivered by the target delivery robot from the to-be-delivered goods temporarily stored in the at least one receiving bin according to the storage time of the to-be-delivered goods temporarily stored in each of the at least one receiving bin.

With reference to the thirteenth aspect and the implementation above, in the third implementation of the thirteenth aspect of the present disclosure, the second determining module includes: a seventh obtaining sub-module configured to obtain the remaining delivery time of the to-be-delivered goods temporarily stored in each of the at least one receiving bin, and the remaining delivery time indicates a time difference from a current time to a scheduled delivery time of the to-be-delivered goods; a eighth obtaining sub-module configured to determine the target goods currently to be delivered by the target delivery robot from the to-be-delivered goods temporarily stored in the at least one receiving bin according to the remaining delivery time of the to-be-delivered goods temporarily stored in each of the at least one receiving bin.

With reference to the thirteenth aspect and the implementation above, in the third implementation of the thirteenth aspect of the present disclosure, the unmanned delivery device also includes a transfer module, the apparatus also includes: a second transferring module configured to automatically transfer the target goods to the target delivery robot through the transfer module.

In the fourteenth aspect, an embodiment of the present disclosure provides a delivery robot dispatching apparatus provided in the target delivery robot of any one of the embodiments in the tenth aspect. Specifically, the delivery robot dispatching apparatus includes: a third receiving module configured to receive a delivery instruction sent by the container body, and the delivery instruction includes order information of the target goods to be delivered; a second delivering module configured to deliver the target goods according to the order information when determining that the target goods are obtained.

With reference to the fourteenth aspect, in the first implementation of the fourteenth aspect of the present disclosure, the apparatus also includes: a fourth receiving module configured to receive the target goods carried by the transfer module cooperating with the container body.

In the fifteenth and sixteenth aspects, the embodiments of the present disclosure provide an electronic device, including a memory configured to store one or more computer instructions supporting the delivery robot dispatching apparatus to execute the delivery robot dispatching in the eleventh and twelfth aspects respectively, and a processor configured to execute the computer instructions stored in the memory. The delivery robot dispatching apparatus may also include a communication interface configured to communicate with other device or a communication network.

In the seventeenth and eighteenth aspects, the embodiments of the present disclosure provide a computer-readable storage medium for storing computer instructions used by the delivery robot dispatching apparatus, which includes computer instructions for executing the delivery robot dispatching methods respectively recited in the eleventh and twelfth aspects.

This embodiment of the present disclosure provides a delivery robot dispatching method. The container body can store goods to be delivered by the target delivery robot in at least one receiving bin, and when the target delivery robot is idle, determine target goods currently to be delivered by the target delivery robot from the to-be-delivered goods stored in the at least one receiving bin, and then instruct the target delivery robot to deliver the target goods. It avoids the situation that when the target delivery robot is busy, a deliverer needs to wait until the target delivery robot is idle so as to hand over the to-be-delivered goods to the target delivery robot, and thus the waiting time of the deliverer is shortened, and the goods delivery efficiency is improved.

It may be understood that the above general descriptions and the below detailed descriptions are merely exemplary and explanatory, and are not intended to limit the present disclosure.

BRIEF DESCRIPTION OF THE DRAWINGS

With reference to the accompanying drawings, through the following detailed description of the non-limiting embodiments, other features, objectives, and advantages of the present disclosure will become more apparent. In the accompanying drawings.

DETAILED DESCRIPTION OF THE EMBODIMENTS

Figure 1A:
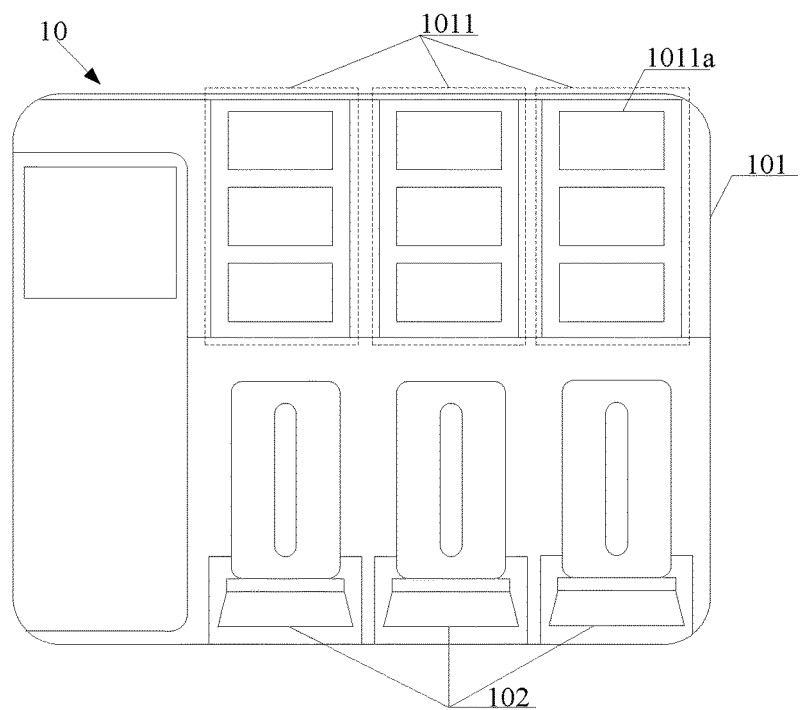
FIGS. 1a and 1b show schematic structural diagrams of unmanned delivery devices according to different embodiments of the present disclosure.

Hereinafter, exemplary embodiments of the present disclosure will be described in detail with reference to the accompanying drawings so that those skilled in the art may easily implement exemplary embodiments. In addition, for the sake of clarity, parts that are not related to describing the exemplary embodiments are omitted in the drawings.

In the present disclosure, it should be understood that terms such as "including" or "having" are intended to indicate the existence of the features, numbers, steps, actions, components, parts, or combinations thereof disclosed in this specification, but not intended to exclude the possible existence or addition of one or more other features, numbers, steps, actions, components, parts or combinations thereof.

In addition, it should be noted that the embodiments in the present disclosure and the features in the embodiments may be combined with each other if there is no conflict. Hereinafter, the present disclosure will be described in detail with reference to the drawings and in conjunction with embodiments.

In accordance with the technical solution provided by the embodiments of the present disclosure, the container body can store a plurality of goods to be delivered by a target delivery robot in a target cabinet group corresponding to the target delivery robot, when the target delivery robot is idle, the target goods currently to be delivered by the target delivery robot are determined from a plurality of to-be-delivered goods stored in the cabinet group, and then the target delivery robot is instructed to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The First Embodiment

This embodiment of the present disclosure provides an unmanned delivery device 10, as shown in FIG. 1a, the unmanned delivery device 10 includes a container body 101 as well as M delivery robots 102 and a transfer module 1013 (not shown in FIG. 1a) connected to the container body 101, the container body 101 is provided with M cabinet groups 1011 respectively corresponding to the M delivery robots 102, and M is an integer greater than or equal to 1. Each of the M cabinet groups 1011 is used to temporarily store at least one goods to be delivered by the corresponding delivery robot 102.

The container body 101 is configured to identify the target delivery robot, obtain the order information of the target goods stored in the target cabinet group corresponding to the target delivery robot, and instruct the target delivery robot to deliver the target goods according to the order information, where the order information includes the delivery address of the target goods, the target delivery robot is any one of the M delivery robots 102.

The transfer module 1013 is used to move the target goods stored in the target cabinet group corresponding to the target delivery robot to the target delivery robot.

In examples, different delivery robots 102 are responsible for different delivery areas. When a deliverer carrying to-be-delivered goods arrives near the unmanned delivery device 10, if the M delivery robots 102 all are on the way of delivering other goods, the container body 101 can obtain the order information of the to-be-delivered goods, then identify a delivery robot responsible for the delivery area indicated by the order information from the M delivery robots 102, instruct the deliverer to store the to-be-delivered goods in the cabinet group corresponding to the delivery robot responsible for the delivery area indicated by the order information, and save the correspondence between the cabinet group and the order information of the to-be-delivered goods.

In examples, the transportation characteristic of different delivery robots 102 are different, and the transportation characteristic may be cold-chain transportation or hot-chain transportation. When a deliverer carrying to-be-delivered goods arrives near the unmanned delivery device 10, if the M delivery robots 102 all are on the way of delivering other goods, the container body 101 can obtain the order information of the to-be-delivered goods, and also can obtain the characteristic of the to-be-delivered goods, the characteristic includes the transportation characteristics of the to-be-delivered goods, that is, hot-chain transportation or cold-chain transportation. After that, the container body 101 can identify a delivery robot with the same transportation characteristic as the transportation characteristic of the to-be-delivered goods from the M delivery robots 102. Then the container body 101 can instruct the deliverer to store the to-be-delivered goods in the cabinet group corresponding to the delivery robot with the same transportation characteristic as the transportation characteristic of the to-be-delivered goods, and save the correspondence between the cabinet group and the order information of the to-be-delivered goods.

In examples, different delivery robots 102 are responsible for delivering different size goods. When a deliverer carrying to-be-delivered goods arrives near the unmanned delivery device 10, if the M delivery robots 102 all are on the way of delivering other goods, the container body 101 can obtain the order information of the to-be-delivered goods, and obtain the characteristic of the to-be-delivered goods, the characteristic includes the dimensional characteristic of the to-be-delivered goods. After that, the container body 101 can identify delivery robots which are responsible for transporting goods matching the dimensional characteristic of the to-be-delivered goods from the M delivery robots 102. Then the container body 101 can instruct the deliverer to store the to-be-delivered goods in the cabinet group corresponding to the delivery robots which are responsible for transporting goods matching the dimensional characteristic of the to-be-delivered goods, and save the correspondence between the cabinet group and the order information of the to-be-delivered goods.

In an optional implementation of the present embodiment, the container body 101 can be wired with the M delivery robots 102 respectively. For example, the container body 101 can be wired with the M delivery robots 102 through cables or other electrical connection methods that can realize information transmission. Alternatively, the container body 101 can be connected to each of M delivery robots 102 through wireless communication. For example, the container body 101 can be connected to each of M delivery robots 102 via Wi-Fi (Wireless Fidelity).

After the to-be-delivered goods are stored in the cabinet group, the container body 101 can monitor the locations of the M delivery robots connected to it in real time. If a certain delivery robot returns to the vicinity of the unmanned delivery device 10, the container body 101 will identify the delivery robot and instruct the delivery robot to deliver the goods. Taking the target delivery robot as an example, when the target delivery robot returns to the vicinity of the unmanned delivery device 10, the container body 101 identifies the target delivery robot, that is, determines the target cabinet group corresponding to the target delivery robot, then determines the target goods to be delivered by the target delivery robot from a plurality of to-be-delivered goods stored in the target cabinet group, and obtains the order information of the target goods, then instructs the transfer module 1013 to move the target goods to the target delivery robot and instructs the target delivery robot to deliver the target goods according to the order information.

Optionally, after the to-be-delivered goods are stored in the cabinet group, the storage time of the to-be-delivered goods can begin to be recorded. When the target delivery robot moves to the vicinity of the unmanned delivery device 10, the container body 101 can obtain the storage time of the to-be-delivered goods stored in the target cabinet group, and then determine the to-be-delivered goods with the longest storage time as the target goods currently to be delivered by the target delivery robot. Alternatively, when obtaining the order information of the to-be-delivered goods, the remaining delivery time of the to-be-delivered goods can also be obtained at the same time. After storing the to-be-delivered goods in the cabinet group, the container body 101 can update the remaining delivery time of the to-be-delivered goods in real time. When the target delivery robot moves to the vicinity of the unmanned delivery device 10, the container body 101 can obtain the remaining delivery time of the to-be-delivered goods stored in the target cabinet group, and then determines the to-be-delivered goods with the shortest remaining delivery time as the target goods currently to be delivered by the target delivery robot.

Figure 1B:
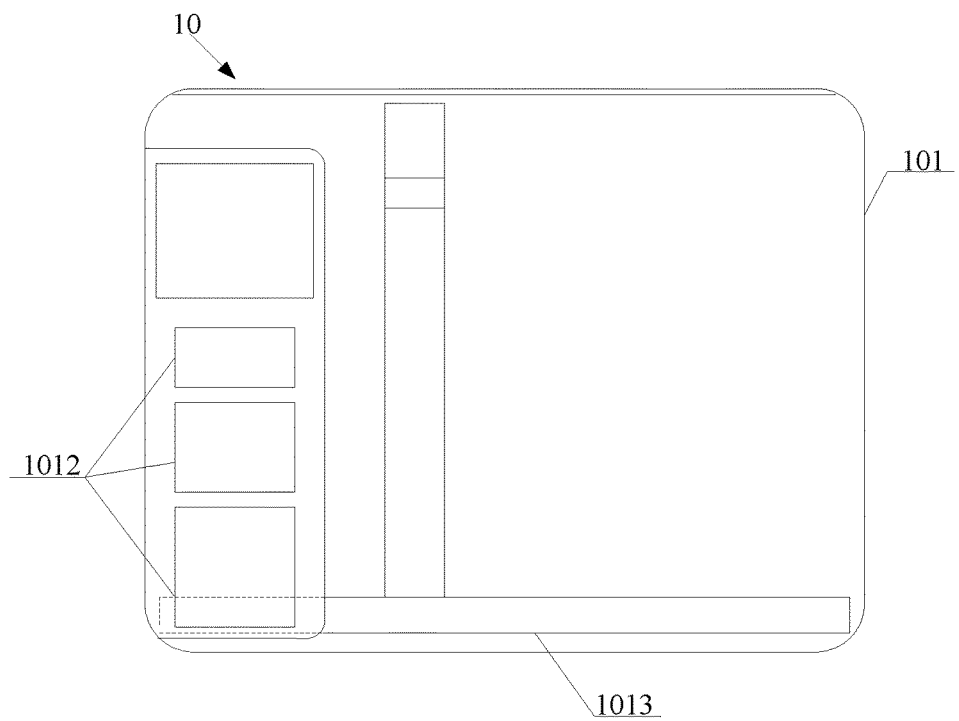

In an optional implementation of this embodiment, as shown in FIG. 1b, the container body 101 can also be provided with at least one receiving bin 1012, the container body 101 shown in FIG. 1b disassembles the cabinet group 1011 and the delivery robots 102 to show the transfer module 1013. The receiving bin 1012 is used to receive and temporarily store the to-be-delivered goods. The container body 101 is configured to determine the delivery robot 102 for delivering the to-be-delivered goods stored in the receiving bin 1012. The transfer module 1013 is used to move the to-be-delivered goods stored in the receiving bin 1012 to the cabinet group 1011 corresponding to the delivery robot 102 responsible for delivering this to-be-delivered goods.

In examples, different receiving bins 1012 are responsible for temporarily storing different size goods. When a deliverer carrying to-be-delivered goods arrives near the unmanned delivery device 10, if the M delivery robots 102 are all on the way of delivering other goods, the container body 101 can obtain the order information of the to-be-delivered goods, and obtain the characteristic of the to-be-delivered goods included in the order information, and the characteristic includes the dimensional characteristic of the to-be-delivered goods. After that, the container body 101 can identify the receiving bin 1012 responsible for temporarily storing goods matching the dimensional characteristic of the to-be-delivered goods from the at least one receiving bin 1012, then instruct the door of the receiving bin 1012 to open. At this time, the deliverer can temporarily store the to-be-delivered goods in the receiving bin 1012. When the container body 101 detects that the receiving bin 1012 is placed with the to-be-delivered goods, it can identify one or more delivery robots, which are responsible for the delivery area indicated by the order information, from the M delivery robots 102 according to the order information of the to-be-delivered goods. After that, by assuming that a delivery robot responsible for the delivery area indicated by the order information is the target delivery robot, the container body 101 can instruct the transfer module 1013 to move the to-be-delivered goods in the receiving bin 1012 to the cabinet group corresponding to the target delivery robot.

In an embodiment, each of the cabinet groups 1011 may include various cabinets 1011a (as shown in FIG. 1a) to temporarily store to-be-delivered goods with different characteristics which include the transportation characteristic or the dimensional characteristic of the to-be-delivered goods. The container body 101 is also configured to determine a cabinet 1011a for storing the to-be-delivered goods, according to the characteristic of the to-be-delivered goods stored in the receiving bin 1012, from the cabinet group 1011 corresponding to the delivery robot 102 responsible for delivering the to-be-delivered goods. The transfer module 1013 is also used to move the to-be-delivered goods stored in the receiving bin 1012 to the cabinet 1011a determined by the container body 101.

Taking the target delivery robot as an example, when the container body 101 detects that the receiving bin 1012 is placed with to-be-delivered goods, the container body 101 identifies the delivery robot responsible for the delivery area indicated by the order information of the to-be-delivered goods as the target delivery robot according to the order information of the to-be-delivered goods, then obtains each type of cabinets 1011a in the target cabinet group corresponding to the target delivery robot, and identifies a cabinet matching the characteristic of the to-be-delivered goods from the various cabinets 1011a included in the target cabinet group. For example, if the characteristic of the to-be-delivered goods indicates that the to-be-delivered goods require cold-chain transportation, the container body 101 can identify a cabinet suitable for cold-chain storage from the various cabinets 1011a included in the target cabinet group as the cabinet for storing the to-be-delivered goods. If the characteristic of the to-be-delivered goods indicates that the dimension of the to-be-delivered goods is relatively large, the container body 101 can identify a cabinet suitable for storing large-size goods from the various cabinets 1011a included in the target cabinet group as the cabinet for storing the to-be-delivered goods. After determining the cabinet 1011a for storing the to-be-delivered goods, the container body 101 instructs the transfer module 1013 to move the to-be-delivered goods stored in the receiving bin 1012 to the determined cabinet.

In an embodiment, each of the cabinet groups 1011 includes at least one cabinet 1011a. The container body 101 is also configured to determine the target goods currently to be delivered by the target delivery robot from the to-be-delivered goods stored in the at least one cabinet 1011a included in the target cabinet group.

Optionally, after the to-be-delivered goods are stored in a cabinet included in the target cabinet group, the storage time of the to-be-delivered goods can begin to be recorded, and the storage time indicates a time of the to-be-delivered goods being stored in the cabinet. When the target delivery robot moves to the vicinity of the unmanned delivery device 10, the container body 101 can obtain the storage time of each of the to-be-delivered goods stored in the at least one cabinet included in the target cabinet group, and then determine the to-be-delivered goods with the longest storage time as the target goods currently to be delivered by the target delivery robot. Alternatively, when obtaining the order information of the to-be-delivered goods, the remaining delivery time of the to-be-delivered goods can also be obtained at the same time. After storing the to-be-delivered goods in the cabinet included in the target cabinet group, the container body 101 can update the remaining delivery time of the to-be-delivered goods in real time. When the target delivery robot moves to the vicinity of the unmanned delivery device 10, the container body 101 can obtain the remaining delivery time of each of the to-be-delivered goods stored in the at least one cabinet included in the target cabinet group, and then determines the to-be-delivered goods with the shortest remaining delivery time as the target goods currently to be delivered by the target delivery robot.

Figure 1C:
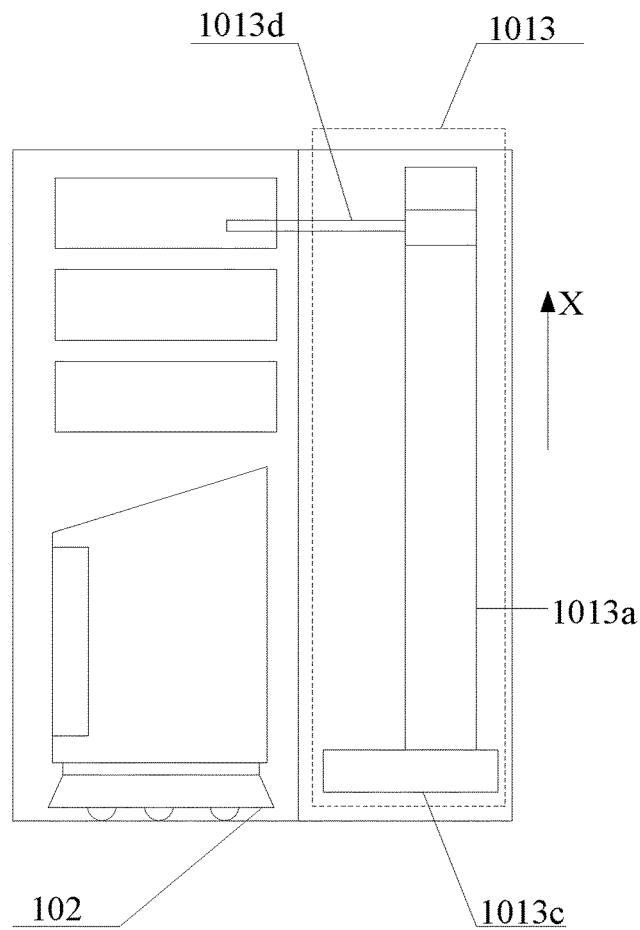
FIG. 1c shows a cross-sectional view of an unmanned delivery device according to an embodiment of the present disclosure.

Specifically, the transfer module 1013 may be as shown in FIG. 1c, which is a cross-sectional view of the container body. The transfer module 1013 includes a moving column 1013a, a telescopic arm 1013d, and a moving track 1013c. One end of the moving column 1013a is clamped with the moving track 1013c, and can slide along the length direction of the moving track 1013c. The length direction of the moving track 1013c is the vertical direction of the paper surface in FIG. 1c. The fixed end of the telescopic arm 1013d is sleeved on the moving column 1013a and can slide along the length direction of the moving column 1013a. The length direction of the moving column 1013a includes the X direction and the opposite direction of the X direction shown in FIG. 1c. When detecting that the to-be-delivered goods are temporarily stored in the receiving bin, the container body 101 can instruct the moving column 1013a to slide along the length direction of the moving track 1013c, and instruct the fixed end of the telescopic arm 1013d to slide along the length direction of the moving column 1013a, so that the telescopic end of the telescopic arm 1013d is aligned with the receiving bin in which the to-be-delivered goods are temporarily stored. At the same time, the container body 101 can instruct the telescopic end of the telescopic arm 1013d to extend below the to-be-delivered goods, so that the to-be-delivered goods are placed on the telescopic end of the telescopic arm 1013d, and then instruct the telescopic end to retract, that is, to move the to-be-delivered goods out of the receiving bin. After the moving out of, the container body 101 can instruct the moving column 1013a to slide along the length direction of the moving track 1013c, and instruct the fixed end of the telescopic arm 1013d to slide along the length direction of the moving column 1013a, so that the telescopic end of the telescopic arm 1013d is aligned with a cabinet included in the target cabinet group. At this time, the container body 101 instructs the telescopic end of the telescopic arm 1013d to extend in a way that the to-be-delivered goods are driven to enter into the cabinet together, and then instructs the telescopic end to tilt in a way that the to-be-delivered goods are placed in the cabinet. After the to-be-delivered goods are placed in the cabinet, the telescopic end is instructed to retract.

In an optional implementation of this embodiment, the target delivery robot is provided with a goods storage bin. The transfer module 1013 is also used to move the target goods stored in the target cabinet group to the goods storage bin of the target delivery robot.

In examples, after determining the target goods to be delivered by the target delivery robot, the container body 101 can instruct the target delivery robot to open the door of the goods storage bin, and instruct the moving column 1013a provided to the transfer module 1013 to slide along the length direction of the moving track 1013c, and instruct the fixed end of the telescopic arm 1013d to slide along the length direction of the moving column 1013a, so that the telescopic end of the telescopic arm 1013d is aligned with the cabinet, in which the target goods are stored, included in the target cabinet group, at this time, the container body 101 instructs the telescopic end of the telescopic arm 1013d to extend below the target goods, so that the target goods are placed on the telescopic end of the telescopic arm 1013d, and then instructs the telescopic end to retract, that is, to move the target goods out of the cabinet. After the moving out of, the container body 101 can instruct the moving column 1013a to slide along the length direction of the moving track 1013c, and instruct the fixed end of the telescopic arm 1013d to slide along the length direction of the moving column 1013a, so that the telescopic end of the telescopic arm 1013d is aligned with the goods storage bin of the target delivery robot. At this time, the container body 101 instructs the telescopic end of the telescopic arm 1013d to extend in a way that the to-be-delivered goods are driven to enter into the goods storage bin together, and instructs the telescopic end to tilt in a way that the to-be-delivered goods are placed in the goods storage bin. After the to-be-delivered goods are placed in the goods storage bin, the telescopic end is instructed to retract. After determining that the target goods are placed in the goods storage bin, the target delivery robot can close the door of the goods storage bin and deliver the target goods according to the order information of the target goods.

In an optional implementation of this embodiment, the container body 101 is provided with M parking sites corresponding to the M delivery robots respectively. Each of the M parking sites is used to park one of the M delivery robots 102 when one of the M delivery robots 102 is idle. Optionally, a charging pile can be provided in each of parking sites, and the charging pile can charge the delivery robot 102 when it is electrically connected with the delivery robot 102. In this way, when the delivery robot 102 is idle, it can move to the corresponding parking site, and be electrically connected with the charging pile provided in the parking site for charging, which ensures the battery level of the delivery robot 102, and avoids the situation that the delivery robot 102 fail to deliver due to the depletion of power during the delivery process.

In an optional implementation of this embodiment, the container body 101 is provided with a display screen on which an order input QR code (Quick Response code) is displayed, and the order input QR code is associated with the order information input interface. The deliverer can use a hand-held terminal to scan the order input QR code, and after the scanning is completed, the terminal will display the order information input interface associated with the order input QR code, and the deliverer can fill in the delivery address of the to-be-delivered goods on the order information input interface, and the characteristic of the to-be-delivered goods can also be inputted. After determining that the deliverer has finished the inputting, the terminal can send the order information of the to-be-delivered goods to the container body 101. The order information includes at least one of the delivery address of the to-be-delivered goods and the characteristic of the to-be-delivered goods, and the characteristic includes the transportation characteristic or the dimensional characteristic of the to-be-delivered goods. Alternatively, the display screen can also display the order information input interface, the deliverer can directly fill in the delivery address of the target goods on the order information input interface and save it. At the same time, the transportation characteristic or the dimensional characteristic of the to-be-delivered goods can also be inputted and saved. After determining that the deliverer has finished the inputting, the container body 101 can save the delivery address and the transportation characteristic or the dimensional characteristic inputted by the deliverer, as the order information of the target goods. At this time, the container body 101 can identify the delivery robot responsible for the delivery area indicated by the order information from the M delivery robots according to the order information of the to-be-delivered goods, and then store the to-be-delivered goods into any idle cabinet included in the cabinet group corresponding to the delivery robot responsible for the delivery area indicated by the order information.

The embodiments of the present disclosure provide an unmanned delivery device 10, where a container body 101 of the unmanned delivery device 10 can store a plurality of goods to be delivered by a target delivery robot in a target cabinet group corresponding to the target delivery robot, when the target delivery robot is idle, determine the target goods currently to be delivered by the target delivery robot from the to-be-delivered goods stored in the cabinet group, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Second Embodiment

Figure 2A:
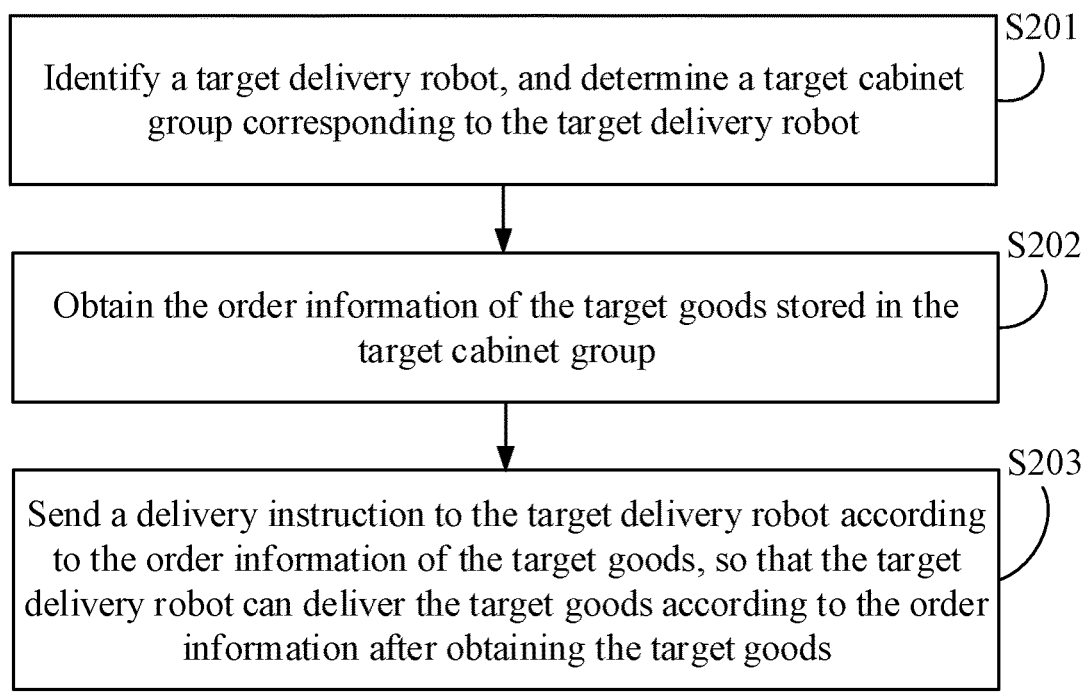
FIGS. 2a and 2d respectively show a flowchart of a delivery robot dispatching method according to different embodiments of the present disclosure, and FIGS. 2b and 2c respectively show a flowchart of step S204 in the delivery robot dispatching method according to different embodiments of the present disclosure.

FIG. 2a shows a flowchart of a delivery robot dispatching method according to an embodiment of the present disclosure. The method is applied to the container body of the first embodiment, which is connected with each of M delivery robots, and the container body is provided with M cabinet groups respectively corresponding to the M delivery robots respectively. As shown in FIG. 2a, the delivery robot dispatching method includes the following steps S201 to S203:

At step S201, a target delivery robot is identified, and a target cabinet group corresponding to the target delivery robot is determined.

At step S202, the order information of the target goods stored in the target cabinet group is obtained.

The target delivery robot may be any one of the M delivery robots, and the order information includes the delivery address.

At step S203, a delivery instruction is sent to the target delivery robot according to the order information of the target goods, so that the target delivery robot can deliver the target goods according to the order information after obtaining the target goods.

In the related art, each area can be set with one or more delivery sites, and each delivery site ca n be configured with one or more delivery robots. After a deliverer arrives at the destination, it can find a delivery site near the destination, and then hands over the goods to be delivered to a delivery robot of the delivery site, and the delivery robot will deliver the goods to the customer. However, if one or more delivery robots provided for the delivery site are all on the way to deliver the goods when the deliverer arrives at the delivery site, the deliverer can only choose to wait or deliver the goods by itself, resulting in a reduction of the goods delivery efficiency of the deliverer.

Considering the above-mentioned defects, in this embodiment, a delivery robot dispatching method is proposed, in this method, the container body can store a plurality of goods to be delivered by a target delivery robot in a target cabinet group corresponding to the target delivery robot. When the target delivery robot is idle, determine the target goods currently to be delivered by the target delivery robot from the to-be-delivered goods stored in the cabinet group, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved. Specifically, a deliverer in the embodiments of the present disclosure may be a natural person who can deliver goods independently, or may be an unmanned device with a delivery function, etc., which is not limited in this embodiment of the present disclosure.

The order information may also include the contact information of the target goods consignee, that is, the mobile phone number or fixed telephone number. After the target delivery robot delivers the target goods to the destination, it can contact the consignee through the contact information to facilitate the consignee to pick up the goods in time.

Taking storing the to-be-delivered goods in the target cabinet group corresponding to the target delivery robot as an example, when the container body obtains the order information of the to-be-delivered goods and determines that the to-be-delivered goods are stored in the target cabinet group, the correspondence between the cabinet and the order information of the to-be-delivered goods can be saved. When the container body determines the to-be-delivered goods as the target goods to be delivered by the target delivery robot, the container body can obtain the order information of the target goods according to the correspondence between the cabinet and the order information of the to-be-delivered goods, then send a delivery instruction to the target delivery robot according to the order information, so that the target delivery robot can deliver the target goods according to the order information included in the delivery instruction after obtaining the target goods.

In an optional implementation of this embodiment, the container body can obtain the location of each of the M delivery robots connected to it in real time, and then determine whether the each of the delivery robots moves to the corresponding parking site according to the location of the each of the delivery robots. If a delivery robot moves to the corresponding parking site, it means that the delivery robot has completed its last delivery and is currently in an idle stage. At this time, the container body can identify the delivery robot, that is, determine the cabinet group corresponding to the delivery robot. Taking the target delivery robot as an example, the container body identifies the delivery robot which is currently returning to the parking site as the target delivery robot, and then determines the target goods currently to be delivered by the target delivery robot from the to-be-delivered goods stored in the cabinet group corresponding to the target delivery robot, the target goods may be one to-be-delivered goods stored in the target cabinet group, or may be a plurality of to-be-delivered goods stored in the target cabinet group, which is not limited in this embodiment of the present disclosure. After determining the target goods, the container body can obtain the order information of the target goods, move the target goods to the goods storage bin of the target delivery robot, and then send a delivery instruction to the target delivery robot according to the order information of the target goods. The target delivery robot can deliver the target goods according to this order information of the target goods included in the received delivery instruction.

In an optional implementation of this embodiment, the method further includes step S204: At step S204, the target goods are determined from the to-be-delivered goods stored in at least one cabinet included in the cabinet group.

Optionally, the container body can determine to-be-delivered goods stored in any one of the at least one cabinet as the target goods to be delivered by the target delivery robot. Alternatively, the container body can determine, according to a preset order, to-be-delivered goods stored in a cabinet, which is ranked first among non-idle cabinets included in the target cabinet group, as the target goods to be delivered by the target delivery robot.

Figure 2B:
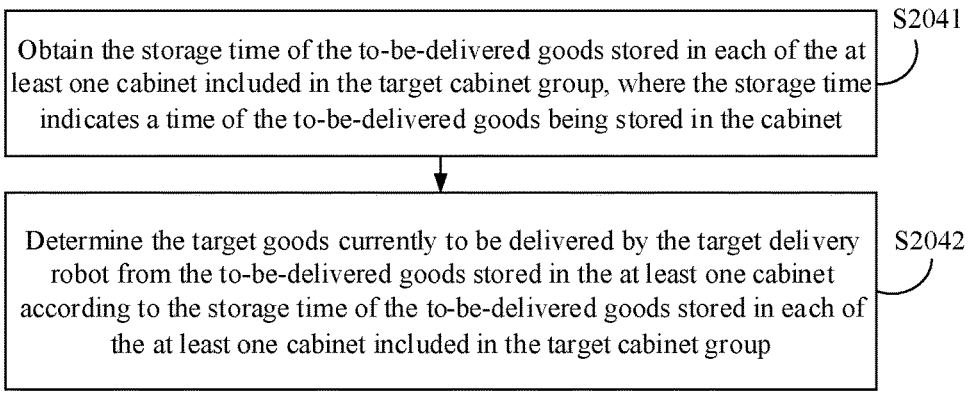

In an optional implementation of this embodiment, as shown in FIG. 2b, the step S204, that is, the step of determining the target goods from the to-be-delivered goods stored in the at least one cabinet included in the target cabinet group, including steps S2041 to S2042:

at step S2041, the storage time of the to-be-delivered goods stored in each of the at least one cabinet included in the target cabinet group is obtained, where the storage time indicates a time of the to-be-delivered goods being stored in the cabinet.

at step S2042, according to the storage time of the to-be-delivered goods stored in each of the at least one cabinet included in the target cabinet group, the target goods currently to be delivered by the target delivery robot are determined from the to-be-delivered goods stored in the at least one cabinet.

In this embodiment, according to the storage time of the to-be-delivered goods stored in each of the cabinets, the target goods currently to be delivered by the target delivery robot are determined, which can avoid an undesirable long storage time of the to-be-delivered goods in the cabinet, thus avoiding the problem of complaints from the consignee due to not receiving the to-be-delivered goods for a long time and improving the user experience.

In examples, after the container body stores each of the to-be-delivered goods in the cabinet, it can begin to record the storage time of each of the to-be-delivered goods. Assuming that the target delivery robot can only deliver one target goods at a time, that is, the target delivery robot is provided with one goods storage bin. When the container body determines that the target delivery robot is idle, it can determine E cabinets, which are placed with to-be-delivered goods, in the at least one cabinet included in the target cabinet group corresponding to the target delivery robot, that is, the E cabinets that are not idle, and then obtain the storage time of the to-be-delivered goods stored in each of the E cabinets, the to-be-delivered goods with the longest storage time are determined as the target goods currently to be delivered by the target delivery robot, and E is an integer greater than or equal to 1.

Alternatively, if the target delivery robot can deliver N target goods at a time, that is, the target delivery robot is provided with N goods storage bins, the N is an integer greater than or equal to 2, then, when the container body determines that the target delivery robot is idle, it can further determine E cabinets, which are placed with to-be-delivered goods, from the at least one cabinet included in the target cabinet group corresponding to the target delivery robot, obtain the storage time of the to-be-delivered goods stored in each of the E cabinets, sort the E to-be-delivered goods according to the storage time from long to short, and then determine the first N to-be-delivered goods as the N target goods to be delivered by the target delivery robot. At this time, the container body can move the N target goods to the N goods storage bins provided to the target delivery robot sequentially, and obtain the order information of the N target goods respectively. After that, the container body can send a delivery instruction to the target delivery robot according to the order information of the N target goods, so that the target delivery robot can deliver each of the N target goods according to the order information of the N target goods in the delivery instruction.

Figure 2C:
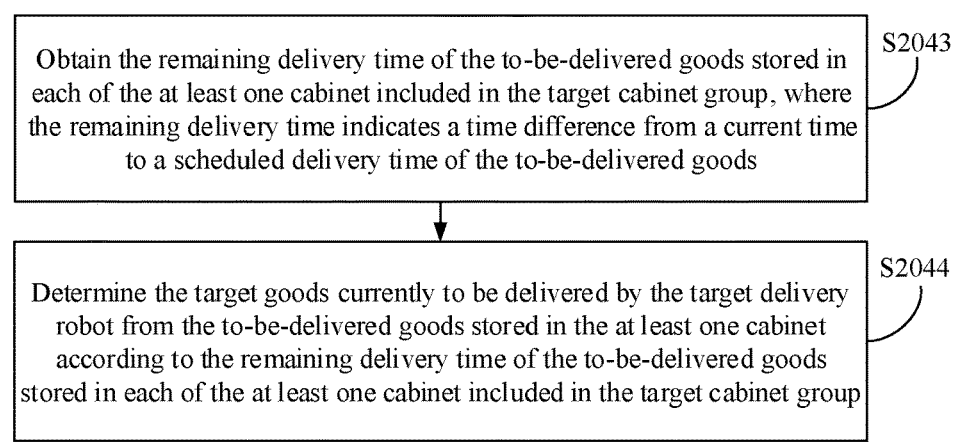

In an optional implementation of this embodiment, as shown in FIG. 2c, the step S204, that is, the step of determining the target goods from the to-be-delivered goods stored in the at least one cabinet included in the target cabinet group, including steps S2043 to S2044:

At step S2043, the remaining delivery time of the to-be-delivered goods stored in each of the at least one cabinet included in the target cabinet group is obtained, and the remaining delivery time indicates a time difference from a current time to a scheduled delivery time of the to-be-delivered goods.

At step S2044, according to the remaining delivery time of the to-be-delivered goods stored in each of the at least one cabinet included in the target cabinet group, the target goods currently to be delivered by the target delivery robot are determined from the to-be-delivered goods stored in the at least one cabinet.

In this embodiment, the target goods currently to be delivered by the target delivery robot are determined according to the remaining delivery time of the to-be-delivered goods stored in each of the cabinets, which can avoid delivery timeout of the to-be-delivered goods and improve the user experience.

In examples, when the container body obtains the order information of each of the to-be-delivered goods, it can also obtain the remaining delivery time of each of the to-be-delivered goods at the same time, and update the remaining delivery time of each of the to-be-delivered goods in real time after each of the to-be-delivered goods is stored in the cabinet. Assuming that the target delivery robot can only deliver one target goods at a time, that is, the target delivery robot is provided with one goods storage bin. When the container body determines that the target delivery robot is idle, it can determine E cabinets, which are placed with to-be-delivered goods, in the at least one cabinet included in the target cabinet group corresponding to the target delivery robot, and then obtain the remaining delivery time of the to-be-delivered goods stored in each of the E cabinets, and determine the to-be-delivered goods with the shortest remaining delivery time as the target goods currently to be delivered by the target delivery robot.

Alternatively, if the target delivery robot can deliver N target goods at a time, that is, the target delivery robot is provided with N goods storage bins, when the container body determines that the target delivery robot is idle, it can further determine E cabinets, which are placed with to-be-delivered goods, from the at least one cabinet included in the target cabinet group corresponding to the target delivery robot, obtain the remaining delivery time of the to-be-delivered goods stored in each of the E cabinets, sort the E to-be-delivered goods according to the remaining delivery time from short to long, and then determine the first N to-be-delivered goods as the N target goods to be delivered by the target delivery robot. At this time, the container body can move the N target goods to the N goods storage bins provided to the target delivery robot sequentially, and obtain the order information of the N target goods respectively. After that, the container body can send a delivery instruction to the target delivery robot according to the order information of the N target goods, so that the target delivery robot can deliver each of the N target goods according to the order information of the N target goods in the delivery instruction.

In an embodiment, the unmanned delivery device further includes a transfer module. After determining the target goods, the container body can also automatically transfer the target goods to the target delivery robot through the transfer module.

After determining the target goods, the container body can instruct the goods storage bin of the target delivery robot to open, and then move the target goods to the goods storage bin of the target delivery robot through the transfer module, and send a delivery instruction to the target delivery robot according to the order information of the target goods. After determining that the target goods are placed in the goods storage bin, the target delivery robot can close the door of the goods storage bin, and deliver the target goods according to the order information of the target goods included in the received delivery instruction.

Figure 2D:
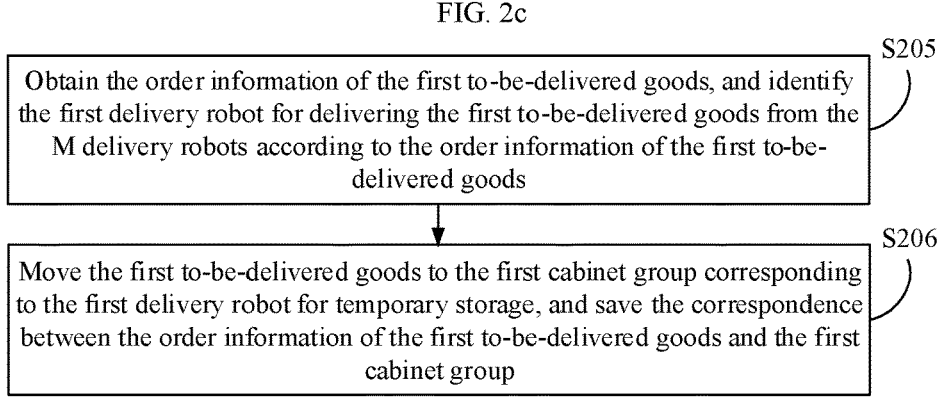

In an optional implementation of this embodiment, as shown in FIG. 2d, the method further includes steps S205 to S206:

At step S205, the order information of the first to-be-delivered goods is obtained, and the first delivery robot for delivering the first to-be-delivered goods is identified from the M delivery robots according to the order information of the first to-be-delivered goods.

The order information includes the characteristic of the first to-be-delivered goods, which may be the transportation characteristic or the dimensional characteristic of the first to-be-delivered goods, and the first to-be-delivered goods is any one of the to-be-delivered goods.

At step S206, the first to-be-delivered goods are moved to the first cabinet group corresponding to the first delivery robot for temporary storage, and the correspondence between the order information of the first to-be-delivered goods and the first cabinet group is saved.

In this embodiment, when the container body determines that the first to-be-delivered goods is to be delivered, it can determine the first delivery robot for delivering the first to-be-delivered goods firstly, and then store the first to-be-delivered goods in the first cabinet group corresponding to the first delivery robot, which reduces the waiting time of the deliverer and improves the goods delivery efficiency.

The transportation characteristic of the first to-be-delivered goods can be divided into cold-chain transportation and hot-chain transportation; the dimensional characteristic of the first to-be-delivered goods can include large size, medium size, and small size.

In examples, different delivery robots are responsible for different delivery areas. When the deliverer carrying the first to-be-delivered goods arrives near the unmanned delivery device, if the M delivery robots all are on the way of delivering other goods, the container body can obtain the order information of the first to-be-delivered goods, and then identify one or more delivery robots responsible for the delivery area indicated by the order information from the M delivery robots according to the order information of the first to-be-delivered goods. If only one of the M delivery robots is responsible for the delivery area indicated by the order information, this only one delivery robot is the first delivery robot. After determining the first delivery robot for delivering the first to-be-delivered goods, the container body can store the first to-be-delivered goods in the first cabinet group corresponding to the first delivery robot. When the container body detects that the first to-be-delivered goods are placed in the first cabinet group, it can save the correspondence between the order information of the first to-be-delivered goods and the first cabinet group.

If at least two of the M delivery robots are responsible for the delivery area indicated by the order information, the container body can also obtain the characteristic of the first to-be-delivered goods according to the order information of the first to-be-delivered goods, and then, according to the characteristic, determine the first delivery robot for delivering the first to-be-delivered goods from the at least two delivery robots responsible for the delivery area indicated by the order information according to the characteristics. For example, if the at least two delivery robots responsible for the delivery area indicated by the order information include a delivery robot responsible for cold-chain transportation and a delivery robot responsible for hot-chain transportation, and the characteristic of the first to-be-delivered goods indicates that the transportation characteristic of the first to-be-delivered goods is cold-chain transportation, the container body can determine the first delivery robot for delivering the first to-be-delivered goods from the at least two delivery robots responsible for the delivery area indicated by the order information, which is responsible for cold-chain transportation. If the characteristic of the first to-be-delivered goods indicates that the transportation characteristic of the first to-be-delivered goods is hot-chain transportation, the container body can determine the first delivery robot for delivering the first to-be-delivered goods from the at least two delivery robots responsible for the delivery area indicated by the order information, which is responsible for hot-chain transportation. If the at least two delivery robots responsible for the delivery area indicated by the order information include a delivery robot responsible for transporting large-size goods and a delivery robot responsible for transporting small-size goods, and the characteristic of the first to-be-delivered goods indicates that the dimensional characteristic of the first to-be-delivered goods is large size, the container body can determine the first delivery robot for delivering the first to-be-delivered goods from the at least two delivery robots responsible for the delivery area indicated by the order information, which is responsible for transporting large-size goods. If the characteristic of the first to-be-delivered goods indicates that the dimensional characteristic of the first to-be-delivered goods is small-size, the container body can determine the first delivery robot for delivering the first to-be-delivered goods from the at least two delivery robots responsible for the delivery area indicated by the order information, which is responsible for transporting small-size goods.

In examples, different delivery robots have different transportation characteristics, and the transportation characteristic may be cold-chain transportation or hot-chain transportation. When the deliverer carrying the first to-be-delivered goods arrives near the unmanned delivery device, if the M delivery robots are on the way of delivering other goods, the container body can obtain the order information of the first to-be-delivered goods, and then obtain the characteristic of the first to-be-delivered goods according to the order information, and identify one or more delivery robots with the same transportation characteristic as the transportation characteristic of the first to-be-delivered goods from the M delivery robots according to the characteristic of the first to-be-delivered goods. If only one of the M delivery robots has the same transportation characteristic as the transportation characteristic of the first to-be-delivered goods, this only one delivery robot is the first delivery robot. At this time, the container body can store the first to-be-delivered goods in the first cabinet group corresponding to the first delivery robot. When the container body detects that the first cabinet group is placed with the first to-be-delivered goods, it can save the correspondence between the order information of the first to-be-delivered goods and the first cabinet group.

If at least two of the M delivery robots have the same transportation characteristic as the transportation characteristic of the first to-be-delivered goods, and the at least two delivery robots with the same transportation characteristic as the transportation characteristic of the first to-be-delivered goods are responsible for different delivery areas respectively, the container body can also determine the first delivery robot for delivering the first to-be-delivered goods from the at least two delivery robots with the same transportation characteristic as the transportation characteristic of the first to-be-delivered goods according to the delivery address included in the order information of the first to-be-delivered goods.

In examples, different delivery robots are responsible for transporting different size goods. When the deliverer carrying the first to-be-delivered goods arrives near the unmanned delivery device, if the M delivery robots all are on the way of delivering other goods, the container body can obtain the order information of the first to-be-delivered goods, obtain the characteristic of the first to-be-delivered goods according to the order information, and then identify, according to the characteristic of the first to-be-delivered goods, one or more delivery robots which are responsible for transporting goods matching the dimensional characteristic of the first to-be-delivered goods from the M delivery robot. If only one of the M delivery robots is responsible for transporting goods matching the dimensional characteristic of the first to-be-delivered goods, this only one delivery robot is the first delivery robot. At this time, the container body can store the first to-be-delivered goods in the first cabinet group corresponding to the first delivery robot. When the container body detects that the first to-be-delivered goods are placed in the first cabinet group, it can save the correspondence between the order information of the first to-be-delivered goods and the first cabinet group.

If at least two of the M delivery robots are responsible for transporting goods matching the dimensional characteristic of the first to-be-delivered goods, and the at least two delivery robots responsible for transporting goods matching the dimensional characteristic of the first to-be-delivered goods are responsible for different delivery areas respectively, the container body can also determine the first delivery robot for delivering the first to-be-delivered goods from the at least two delivery robots responsible for transporting goods matching the dimensional characteristic of the first to-be-delivered goods according to the delivery address included in the order information of the first to-be-delivered goods.

In an embodiment, each of cabinet groups can include various cabinets to store the to-be-delivered goods with different characteristics. The container body may also determine the characteristic of the first to-be-delivered goods based on the order information of the first to-be-delivered goods, the characteristic includes the transportation characteristic or the dimensional characteristic of the first to-be-delivered goods, then, according to the characteristic of the first to-be-delivered goods, determine the first cabinet for storing the first to-be-delivered goods from the at least one cabinet included in the first cabinet group corresponding to the first delivery robot, further instruct the transfer module to move the first to-be-delivered goods to the first cabinet included in the first cabinet group, and save the correspondence between the order information of the first to-be-delivered goods and the first cabinet.

In examples, the container body can obtain the order information of the first to-be-delivered goods firstly, then according to the characteristic of the first to-be-delivered, determine the first cabinet for storing the first to-be-delivered goods from the at least one cabinet included in the first cabinet group corresponding to the first delivery robot, and then the container body instructs the door of the first cabinet to open, moves the first to-be-delivered goods to the first cabinet through the transfer module. When the container body detects that the first to-be-delivered goods are placed in the first cabinet, it can save the correspondence between the order information of the first to-be-delivered goods and the first cabinet.

Optionally, the container body can determine the first cabinet for storing the first to-be-delivered goods from the at least one cabinet included in the first cabinet group corresponding to the first delivery robot according to the characteristic of the first to-be-delivered. That is, if the characteristic of the first to-be-delivered goods indicates that the first to-be-delivered goods require cold-chain transportation, a cabinet capable of cold-chain storage among the at least one cabinet included in the first cabinet group corresponding to the first delivery robot is determined as the first cabinet for storing the first to-be-delivered goods; or if the characteristic of the first to-be-delivered goods indicates that the first to-be-delivered goods require hot-chain transportation, a cabinet capable of hot-chain storage among the at least one cabinet included in the first cabinet group corresponding to the first delivery robot is determined as the first cabinet for storing the first to-be-delivered goods; or if the characteristic of the first to-be-delivered goods indicates that the first to-be-delivered goods are large-size goods, a cabinet capable of storing large-sized goods among the at least one cabinet included in the first cabinet group corresponding to the first delivery robot is determined as the first cabinet for storing the first to-be-delivered goods. For goods of other sizes, please refer to the storage of large-size goods described above, which is not described in detail in this embodiment of the present disclosure.

In an optional implementation of this embodiment, the method further includes step S207: when detecting that the first to-be-delivered goods are placed in the first storage cabinet, it begins to record the storage time of the first to-be-delivered goods stored in the first cabinet.

In examples, when the container body detects that the first to-be-delivered goods are placed in the first cabinet, it may begin to record the storage time of the first to-be-delivered goods stored in the first cabinet. In this way, when the container body determines that the first delivery robot is idle, it can obtain the storage time of the first to-be-delivered goods stored in the first cabinet, and then determine whether the first to-be-delivered goods are the target goods according to the storage time.

In an optional implementation of this embodiment, the method further includes step S208 and step S209:

At step S208, the remaining delivery time of the first to-be-delivered goods is obtained.

At step S209, when detecting that the first to-be-delivered goods are placed in the first cabinet, it begins to update the remaining delivery time of the first to-be-delivered goods in real time.

In examples, when the container body obtains the order information of the first to-be-delivered goods, it can also obtain the remaining delivery time of the first to-be-delivered goods at the same time. After detecting that the first to-be-delivered goods are placed in the first cabinet, the container body can update the remaining delivery time of the first to-be-delivered goods in real time. In this way, when the container body determines that the first delivery robot is idle, it can obtain the remaining delivery time of the first to-be-delivered goods stored in the first cabinet, and then determine whether the first to-be-delivered goods are the target goods according to the remaining delivery time.

In an optional implementation of this embodiment, the container body is further provided with at least one receiving bin, and the receiving bin is used to temporarily store the to-be-delivered goods; the method further includes steps S210 to S211:

At step S210, according to the order information of the first to-be-delivered goods, a first receiving bin that temporarily stores the first to-be-delivered goods is determined from the at least one receiving bin. The first to-be-delivered goods are any to-be-delivered goods.

At step S211, when detecting that the first to-be-delivered goods are placed in the first receiving bin, the step of determining the first delivery robot for delivering the first to-be-delivered goods from the M delivery robots according to the order information of the first to-be-delivered goods is then executed.

In examples, when a deliverer arrives near the container body, if all M delivery robots are on the way of delivery, the deliverer can firstly input the order information of the to-be-delivered goods on the container body. The container body can determine the delivery robot for delivering the to-be-delivered goods among the M delivery robots according to the order information, and temporarily store the to-be-delivered goods, so as to instruct the delivery robot to deliver the to-be-delivered goods after the delivery robot returns. Assuming that the container body is not provided with such receiving bins, the container body will instruct the deliverer to place the to-be-delivered goods into the cabinet group corresponding to the delivery robot. If the cabinet group instructed by the container body is far away from the deliverer, the deliverer needs to walk to the cabinet group to store the to-be-delivered goods, which virtually wastes the delivery time of the deliverer. The receiving bins can be provided below the display screen of the container body, that is, after determining that the deliverer has inputted the order information of the to-be-delivered goods, the container body can promptly instruct the receiving bin to open, the deliverer can leave after placing the to-be-delivered goods into the receiving bin, then the container body and the transfer module cooperate to move the to-be-delivered goods to the appropriate cabinet group. In this way, the delivery time of the deliverer is further saved, and the user experience is better.

In examples, different receiving bins correspond to different transportation characteristics, and the transportation characteristics may be cold-chain transportation or hot-chain transportation. When the deliverer carrying the first to-be-delivered goods arrives near the unmanned delivery device, if the M delivery robots are on the way of delivering other goods, the container body can obtain the characteristic of the first to-be-delivered goods included in the order information of the first to-be-delivered goods, then determine the receiving bin with the same transportation characteristic as the transportation characteristic of the first to-be-delivered goods from the at least one receiving bin according to the characteristic of the first to-be-delivered goods. This receiving bin is the first receiving bin.

In examples, different receiving bins correspond to different goods sizes such as large size, medium size and small size. When the deliverer carrying the first to-be-delivered goods arrives near the unmanned delivery device, if the M delivery robots are on the way of delivering other goods, the container body can obtain the characteristic of the first to-be-delivered goods included in the order information of the first to-be-delivered goods, then determine the receiving bin corresponding to the goods matching the dimensional characteristic of the first to-be-delivered goods from the at least one receiving bin according to the characteristic of the first to-be-delivered goods. This receiving bin is the first receiving bin.

In practical application, there may also be situations where different receiving bins correspond to different areas. When the deliverer carrying the first to-be-delivered goods arrives near the unmanned delivery device, if the M delivery robots are on the way of delivering other goods, the container body can obtain the delivery address included in the order information of the first to-be-delivered goods, and then determine the receiving bin corresponding to the same area as the area indicated by the order information from the at least one receiving bin according to the delivery address. This receiving bin is the first receiving bin.

After the first receiving bin for temporarily storing the first to-be-delivered goods is determined, the container body may instruct the door of the first receiving bin to open. When the deliverer observes that the door of the first receiving bin is opened, he can place the first to-be-delivered goods into the first receiving bin. The container body may, after determining that it has received a bin door closing instruction, instruct the door of the first receiving bin to close. Specifically, after placing the to-be-delivered goods into the first receiving bin, the deliverer can input the bin door closing instruction by clicking the confirm button on the container body. Optionally, the deliverer can also send the bin door closing instruction through the mobile phone. Optionally, the container body can automatically detect whether the first to-be-delivered goods is placed in the first receiving bin, and confirm that the bin door closing instruction is obtained when detecting that the first to-be-delivered goods are stored in the first receiving bin. At this time, the container body can identify the first delivery robot that delivers the first to-be-delivered goods from the M delivery robots according to the order information of the first to-be-delivered goods, store the first to-be-delivered goods to the first cabinet group corresponding to the first delivery robot, and save the correspondence between the order information of the first to-be-delivered goods and the first cabinet group.

This embodiment of the present disclosure provides a delivery robot dispatching method, where the container body can store a plurality of goods to be delivered by the target delivery robot in the target cabinet group corresponding to the target delivery robot, and when the target delivery robot is idle, determine target goods currently to be delivered by the target delivery robot from the to-be-delivered goods stored in the cabinet group, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Third Embodiment

Figure 3:
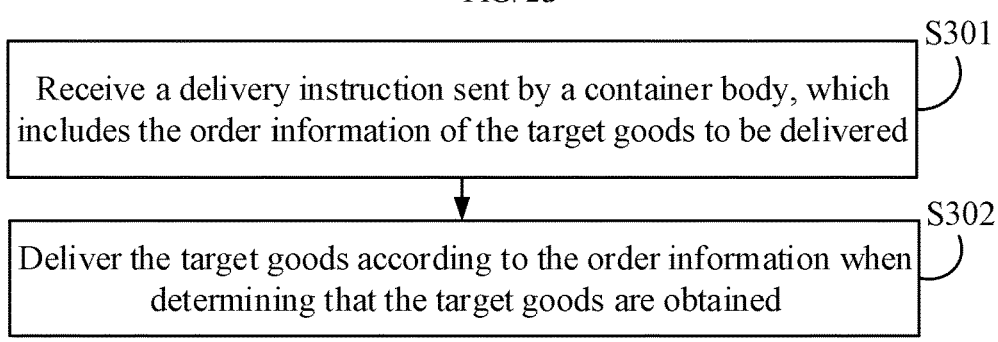
FIG. 3 shows a flowchart of a delivery robot dispatching method according to an embodiment of the present disclosure.

FIG. 3 shows a flowchart of a delivery robot dispatching method according to an embodiment of the present disclosure. This method is applied to the target delivery robot in the first embodiment above. As shown in FIG. 3, the delivery robot dispatching method includes the following steps S301 to S302:

At step S301, a delivery instruction sent by a container body is received, which includes the order information of the target goods to be delivered.

At step S302, when determining that the target goods are obtained, the target goods are delivered according to the order information.

In the related art, after a deliverer arrives at the destination, it can randomly hand over the goods to be delivered to any one of the delivery robots provided for the delivery site. However, if the delivery robots provided for the delivery site are all on the way to deliver goods when the deliverer arrives at the delivery site, the deliverer can only choose to wait or deliver the goods by itself, resulting in a reduction of the goods delivery efficiency of the deliverer.

Considering the above-mentioned defects, in this embodiment, a delivery robot dispatching method is proposed. In this method, the target delivery robot can receive the delivery instruction sent by the container body, and the delivery instruction includes the order information of the target goods to be delivered. Then, the delivery robot delivers the target goods according to the order information when determining that the target goods are obtained. Since a plurality of goods to be delivered by the target delivery robot are stored in the container body, the target delivery robot can deliver them sequentially according to instructions from the container body. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The order information included in the delivery instruction may also include the contact information of the consignee of the target goods, that is, a mobile phone number or a fixed phone number. After the target delivery robot delivers the target goods to the destination, it can contact the consignee through this contact information, so that the consignee can pick up the goods in time.

In the process of delivering the target goods, the target delivery robot can obtain the current location coordinates in real time through its own GPS module, and send location feedback information to the container body according to the obtained location coordinates, so that the container body can obtain the current location of the target delivery robot in real time. Alternatively, the target delivery robot may also send location feedback information to the container body according to the location request information sent by the container body.

The target delivery robot is provided with at least one goods storage bin, which can be used to store the target goods to be delivered.

In an optional implementation of this embodiment, after receiving the delivery instruction sent by the container body, the target delivery robot can receive the target goods transferred by the container body, that is, the target delivery robot opens the door of the goods storage bin, and the container body moves the target goods to the goods storage bin through the transfer module. When the target delivery robot determines that the goods storage bin is placed with goods, it determines to obtain the target goods to be delivered by it. At this time, the target delivery robot can close the goods storage bin and deliver the target goods according to the order information of the target goods.

This embodiment of the present disclosure provides a delivery robot dispatching method, where the container body can store a plurality of goods to be delivered by the target delivery robot in the target cabinet group corresponding to the target delivery robot, and the target delivery robot can sequentially deliver the to-be-delivered goods stored in the target cabinet corresponding to it according to the instructions from the container body. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Fourth Embodiment

Figure 4A:
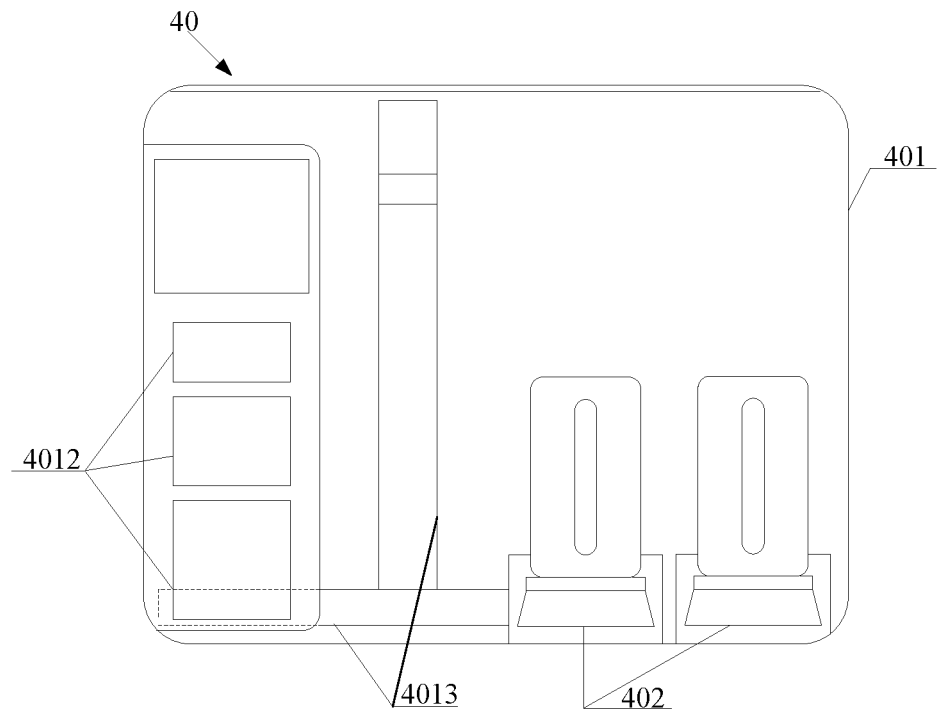
FIG. 4a shows a schematic structural diagram of an unmanned delivery device according to an embodiment of the present disclosure.

The embodiment of the present disclosure provides an unmanned delivery device 40. As shown in FIG. 4a, the unmanned delivery device 40 includes a container body 401 as well as M delivery robots 402 and a transfer module 4013 connected to the container body 401. The container body 401 is provided with at least one receiving bin 4012.

Each of receiving bins 4012 is used to temporarily store goods to be delivered by the M delivery robots 402.

The container body 401 is configured to identify a target delivery robot, determine order information of target goods that are to be delivered by the target delivery robot and temporarily stored in the receiving bin 4012, and instruct the target delivery robot to deliver the target goods according to the order information, where the order information includes the delivery address of the target goods, and the target delivery robot is any one of the M delivery robots 402.

The transfer module 4013 is used to move the target goods temporarily stored in the receiving bin 4012 to the target delivery robot.

In examples, when a deliverer carrying to-be-delivered goods arrives near the unmanned delivery device 40, if the M delivery robots 402 are on the way of delivering other goods, the container body 401 can obtain the order information of the to-be-delivered goods, and then instruct the deliverer to temporarily store the goods to be delivered in the at least one receiving bin 4012 that does not store the to-be-delivered goods, that is, an idle receiving bin, and save the correspondence between the receiving bin and the order information of the to-be-delivered goods. For example, after obtaining the order information of the to-be-delivered goods, the container body 401 can instruct the receiving bin 4012 to open the door. The deliverer can place the to-be-delivered goods in the receiving bin 4012 after observing that the door of the receiving bin 4012 is open. When the container body 401 detects that the receiving bin 4012 is placed with to-be-delivered goods, it closes the bin door and saves the correspondence between the receiving bin and the order information of the to-be-delivered goods.

After storing the to-be-delivered goods into the receiving bin, the container body 401 can monitor the locations of the M delivery robots 402 connected to it in real time, and if a certain delivery robot returns to the vicinity of the unmanned delivery device 40, the container body 401 will identify the delivery robot and instruct the delivery robot to deliver goods. Taking the target delivery robot as an example, if different delivery robots 402 are responsible for different delivery areas, and when the target delivery robot returns to the vicinity of the unmanned delivery device 40, the container body 401 can identify the target delivery robot, that is, to determine the delivery area for which the target delivery robot is responsible. And then, the container body 401 can, according to the pre-saved correspondence between the receiving bin and the order information, determine to-be-delivered goods whose order information matches the delivery area of the target delivery robot from the to-be-delivered goods stored in the at least one receiving bin, as the target goods to be delivered by the target delivery robot, and instruct the transfer module 4013 to move the target goods to the target delivery robot. After that, the container body 401 can send a delivery instruction to the target delivery robot according to the order information of the target goods, so that the target delivery robot can deliver the target goods according to the order information included in the delivery instruction.

Alternatively, the container body 401 can also obtain the characteristic of the to-be-delivered goods while obtaining the delivery address of the to-be-delivered goods, that is, in addition to the delivery address, the order information also includes the characteristic of the to-be-delivered goods such as a transportation characteristic or a dimensional characteristic of the to-be-delivered goods. The at least one receiving bin 4012 stores to-be-delivered goods with different characteristics. When a deliverer carrying to-be-delivered goods arrives near the unmanned delivery device 40, if the M delivery robots 402 are all on the way of delivering other goods, the container body 401 can temporarily store the to-be-delivered goods in a receiving bin matching the characteristic of the to-be-delivered goods among the at least one receiving bin 4012 and save the correspondence between the receiving bin and the order information of the to-be-delivered goods.

After storing the to-be-delivered goods to the receiving bin, the container body 401 can monitor the locations of the M delivery robots 402 connected to it in real time, and if a delivery robot returns to the vicinity of the unmanned delivery device 40, the container body 401 identifies the delivery robot and instructs the delivery robot to deliver goods. Taking the target delivery robot as an example, if the transportation characteristic of different delivery robots 402 are different, the transportation characteristic can be cold-chain transportation or hot-chain transportation. When the target delivery robot returns to the vicinity of the unmanned delivery device 40, the container body 401 can identify the target delivery robot, that is, to determine the transportation characteristic of the target delivery robot. And then, the container body 401 can, according to the pre-saved correspondence between the receiving bin and the order information, determine to-be-delivered goods with the same transportation characteristic as the transportation characteristic of the target delivery robot from the to-be-delivered goods stored in the at least one receiving bin, as the target goods to be delivered by the target delivery robot, and instruct the transfer module 4013 to move the target goods to the target delivery robot. After that, the container body 401 can send a delivery instruction to the target delivery robot according to the order information of the target goods, so that the target delivery robot can deliver the target goods according to the order information included in the delivery instruction.

Alternatively, if different delivery robots 402 can transport goods with different sizes, when the target delivery robot returns to the vicinity of the unmanned delivery device 40, the container body 401 can identify the target delivery robot, that is, to determines the sizes of goods that the target delivery robot can transport. And then, the container body 401 can, according to the pre-stored correspondence between the receiving bin and the order information, determine to-be-delivered goods with the dimensional characteristic matching the sizes of goods that the target delivery robot can transport from the goods to be delivered and stored in the at least one receiving bin, as the target goods to be delivered by the target delivery robot, and instruct the transfer module 4013 to move the target goods to the target delivery robot. After that, the container body 401 can send a delivery instruction to the target delivery robot according to the order information of the target goods, so that the target delivery robot can deliver the target goods according to the order information included in the delivery instruction.

In an optional implementation of the present embodiment, the container body 101 can be wired with the M delivery robots 102 respectively. For example, the container body 101 can be wired with the M delivery robots 102 through cables or other electrical connection methods that can realize information transmission. Alternatively, the container body 101 can be connected to each of M delivery robots 102 through wireless communication. For example, the container body 101 can be connected to each of M delivery robots 102 via Wi-Fi (Wireless Fidelity).

In an embodiment, the container body 401 can also determine the target goods currently to be delivered by the target delivery robot from the to-be-delivered goods temporarily stored in the at least one receiving bin 4012.

After the to-be-delivered goods are stored in the receiving bin 4012, the container body 401 may begin to record the storage time of the to-be-delivered goods, and the storage time indicates a time of the to-be-delivered goods being stored in the receiving bin 4012. When the target delivery robot moves to the vicinity of the unmanned delivery device 40, the container body 401 can obtain the storage time of the to-be-delivered goods stored in each of the at least one receiving bin 4012, and then determine the to-be-delivered goods with the longest storage time as the target goods currently to be delivered by the target delivery robot. Alternatively, when obtaining the order information of the to-be-delivered goods, the remaining delivery time of the to-be-delivered goods can also be obtained at the same time. After the to-be-delivered goods are stored in the receiving bin 4012, the container body 401 can update the remaining delivery time of the to-be-delivered goods in real time. When the target delivery robot moves to the vicinity of the unmanned delivery device 40, the container body 401 can obtain the remaining delivery time of the to-be-delivered goods stored in each of the at least one receiving bin 4012, and then determine the to-be-delivered goods with the shortest remaining delivery time as the target goods currently to be delivered by the target delivery robot.

In an optional implementation of this embodiment, the target delivery robot is provided with a goods storage bin. The transfer module 4013 is also used to move the target goods stored in the receiving bin 4012 to the goods storage bin of the target delivery robot.

Figure 4B:
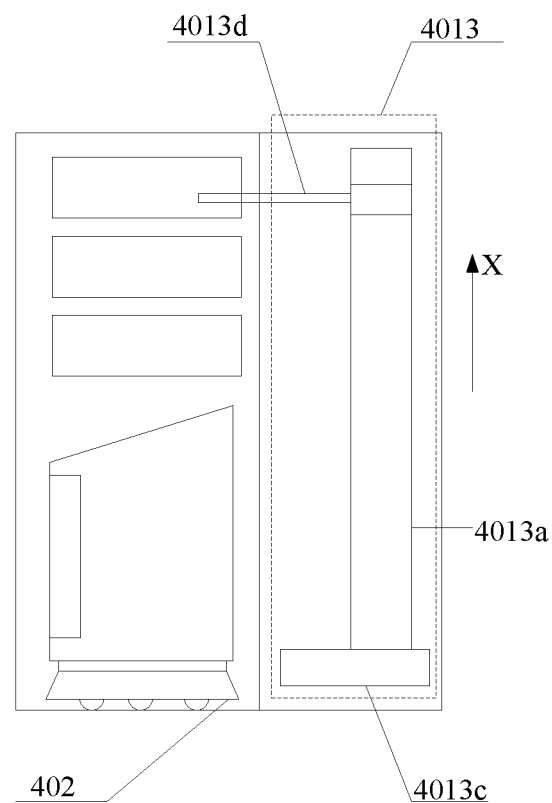
FIG. 4b shows a sectional view of an unmanned delivery device according to an embodiment of the present disclosure.

In examples, the transfer module 4013 may be as shown in FIG. 4b, which is a cross-sectional view of the container body. The transfer module 4013 includes a moving column 4013a, a telescopic arm 4013d, and a moving track 4013c. One end of the moving column 4013a is clamped with the moving track 4013c and can slide along the length direction of the moving track 4013c. The length direction of the moving track 4013c is the vertical direction of the paper surface in FIG. 4b. The fixed end of the telescopic arm 4013d is sleeved on the moving column 4013a and can slide along the length direction of the moving column 4013a. The length direction of the moving column 4013a is the X direction and the opposite direction of the X direction shown in FIG. 4b. After determining the target goods to be delivered by the target delivery robot, the container body 401 can instruct the target delivery robot to open the door of the goods storage bin, and instruct the moving column 4013a provided to the transfer module 4013 to slide along the length direction of the moving track 4013c, and instruct, at the same time, the fixed end of the telescopic arm 4013d to slide along the length direction of the moving column 4013a, so that the telescopic end of the telescopic arm 4013d is aligned with the receiving bin 4012 in which the target goods are stored. After that, the container body 401 instructs the telescopic end of the telescopic arm 4013d to extend below the target goods so that the target goods are placed on the telescopic end of the telescopic arm 4013d, and then instructs the telescopic end to retract, that is, to move the target goods out of the receiving bin 4012. After the moving out of, the container body 401 can instruct the moving column 4013a to slide along the length direction of the moving track 4013c, and at the same time instruct the fixed end of the telescopic arm 4013d to slide along the length direction of the moving column 4013a, so that the telescopic end of the telescopic arm 4013d is aligned with the goods storage bin of the target delivery robot. At this time, the container body 401 instructs the telescopic end of the telescopic arm 4013d to extend in a way that the to-be-delivered goods are driven to enter into the goods storage bin together, and instructs the telescopic end to tilt in a way that the to-be-delivered goods are placed in the goods storage bin. After the to-be-delivered goods are placed in the goods storage bin, the telescopic end is instructed to retract. After determining that the target goods are placed in the goods storage bin, the target delivery robot can close the door of the goods storage bin and deliver the target goods according to the order information of the target goods.

In an optional implementation of this embodiment, the container body 401 is provided with M parking sites corresponding to the M delivery robots respectively. Each of the M parking sites is used to park one of the M delivery robots 402 when one of the M delivery robots 402 is idle. Optionally, a charging pile can be provided in each of parking sites, and the charging pile can charge the delivery robot 402 when it is electrically connected with the delivery robot 402. In this way, when the delivery robot 402 is idle, it can move to the corresponding parking site, and be electrically connected with the charging pile provided in the parking site for charging, which ensures the battery level of the delivery robot 402, and avoids the situation that the delivery robot 402 fail to deliver due to the depletion of power during the delivery process.

In an optional implementation of this embodiment, the container body 401 is provided with a display screen on which an order input QR code (Quick Response code) is displayed, and the order input QR code is associated with the order information input interface. The deliverer can use a hand-held terminal to scan the order input QR code, and after the scanning is completed, the terminal will display the order information input interface associated with the order input QR code, and the deliverer can fill in the delivery address of the to-be-delivered goods on the order information input interface, and the characteristic of the to-be-delivered goods can also be inputted. After determining that the deliverer has finished the inputting, the terminal can send the order information of the to-be-delivered goods to the container body 401. The order information includes at least one of the delivery address of the to-be-delivered goods and the characteristic of the to-be-delivered goods, and the characteristic includes the transportation characteristic or the dimensional characteristic of the to-be-delivered goods. Alternatively, the display screen can also display the order information input interface, the deliverer can directly fill in the delivery address of the target goods on the order information input interface and save it. At the same time, the transportation characteristic or the dimensional characteristic of the to-be-delivered goods can also be inputted and saved. After determining that the deliverer has finished the inputting, the container body 401 can save at least one of the delivery address and the characteristic inputted by the deliverer as the order information of the target goods.

This embodiment of the present disclosure provides an unmanned delivery device 40. The container body 401 of the unmanned delivery device 40 can store goods to be delivered by the target delivery robot in at least one receiving bin 4012, and when the target delivery robot is idle, determine the target goods currently to be delivered by the target delivery robot from the to-be-delivered goods stored in the at least one receiving bin 4012, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Fifth Embodiment

Figure 5A:
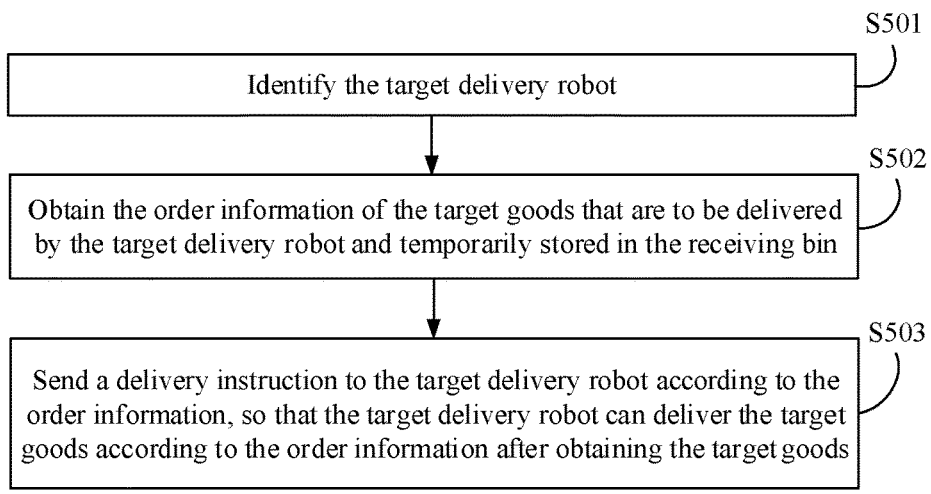
FIG. 5a shows a flowchart of a delivery robot dispatching method according to an embodiment of the present disclosure, and FIGS. 5b and 5c respectively show a flowchart of step S504 in the delivery robot dispatching method according to different embodiments of the present disclosure.

FIG. 5a shows a flowchart of a delivery robot dispatching method according to an embodiment of the present disclosure. This method is applied to the container body of the fourth embodiment above, which is connected with each of M delivery robots, and the container body is provided with at least one receiving bin for temporarily storing to-be-delivered goods. As shown in FIG. 5a, the delivery robot dispatching method includes the following steps S501 to S503:

At step S501, the target delivery robot is identified.

At step S502, the order information of the target goods that are to be delivered by the target delivery robot and temporarily stored in the receiving bin is obtained.

The target delivery robot is any one of the M delivery robots, and the order information includes the delivery address of the target goods.

At step S503, a delivery instruction is sent to the target delivery robot according to the order information, so that the target delivery robot can deliver the target goods according to the order information after obtaining the target goods.

In the related art, each area can be set with one or more delivery sites, and each delivery site can be provided with one or more delivery robots. When a deliverer arrives at the destination, it can find a delivery site near the destination, and then hand over the goods to be delivered to the delivery robot of the delivery site, and the delivery robot will deliver the goods to the user. However, if one or more delivery robots provided for the delivery site are all on the way to deliver the goods when the deliverer arrives at the delivery site, the deliverer can only choose to wait or deliver the goods by itself, resulting in a reduction of the goods delivery efficiency of the deliverer.

Considering the above-mentioned defects, in this embodiment, a delivery robot dispatching method is proposed. In this method, the container body can store goods to be delivered by the target delivery robot in the at least one receiving bin, and when the target delivery robot is idle, determine the target goods currently to be delivered by the target delivery robot from the to-be-delivered goods stored in the at least one receiving bin, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The order information may also include the contact information of the target goods consignee, that is, the mobile phone number or fixed telephone number. After the target delivery robot delivers the target goods to the destination, it can contact the consignee through the contact information to facilitate the consignee to pick up the goods in time.

After the container body stores the to-be-delivered goods in the receiving bin and obtains the order information of the to-be-delivered goods, the correspondence between the receiving bin and the order information of the to-be-delivered goods can be saved. When the container body determines the to-be-delivered goods as the target goods to be delivered by the target delivery robot, the container body can obtain the order information of the target goods according to the correspondence between the receiving bin and the order information of the to-be-delivered goods, then send a delivery instruction to the target delivery robot according to the order information, so that the target delivery robot can deliver the target goods according to the order information included in the delivery instruction after obtaining the target goods.

In an optional implementation of this embodiment, the container body can obtain the location of each of the M delivery robots connected to it in real time, and then determine whether the each of the delivery robots moves to the corresponding parking site according to the location of the each of the delivery robots. If a delivery robot moves to the corresponding parking site, it means that the delivery robot has completed its last delivery and is currently in an idle stage. At this time, the delivery robot can be identified as the target delivery robot, and then the target goods currently to be delivered by the target delivery robot can be determined from the to-be-delivered goods stored in the at least one receiving bin. The target goods can be one to-be-delivered goods stored in any receiving bin, or a plurality of to-be-delivered goods stored in the at least one receiving bin, which is not limited in this embodiment of the present disclosure. After the target goods are determined, the container body can send a delivery instruction to the target delivery robot according to the order information of the target goods. The target delivery robot, after determining that the target goods are placed in the goods storage bin, may deliver the target goods according to the order information of the target goods included in the received delivery instruction.

In an embodiment, the unmanned delivery device further includes a transfer module. After determining the target goods, the container body can also automatically transfer the target goods to the target delivery robot through the transfer module.

In examples, the target delivery robot is provided with a goods storage bin. After determining the target goods, the container body can instruct the goods storage bin of the target delivery robot to open, and then move the target goods temporarily stored in the receiving bin to the goods storage bin of the target delivery robot through the transfer module, and send a delivery instruction to the target delivery robot according to the order information of the target goods. The target delivery robot can receive the target goods carried by the transfer module, and after determining that the target goods are placed in the goods storage bin, close the door of the goods storage bin, and then deliver the target goods according to the order information of the target goods included in the received delivery instruction.

In an optional implementation of this embodiment, before obtaining the order information of the target goods that are to be delivered by the target delivery robot and temporarily stored in the receiving bin, the method further includes step S504:

At step S504, the target goods currently to be delivered by the target delivery robot are determined from the to-be-delivered goods temporarily stored in the at least one receiving bin.

Optionally, the container body may determine the to-be-delivered goods stored in any one of the at least one receiving bin as the target goods to be delivered by the target delivery robot, or the container body may determine, according to a preset order, the to-be-delivered goods stored in the first receiving bin among the at least one receiving bin as the target goods to be delivered by the target delivery robot.

Figure 5B:
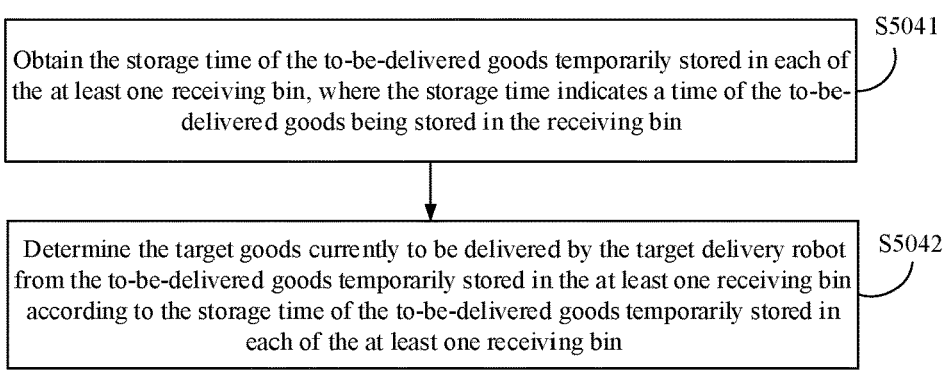

In an optional implementation of this embodiment, as shown in FIG. 5b, the step S504, that is, the step of determining the target goods currently to be delivered by the target delivery robot from the to-be-delivered goods temporarily stored in the at least one receiving bin. Including steps S5041 to S5042:

At step S5041, the storage time of the to-be-delivered goods temporarily stored in each of the at least one receiving bin is obtained, and the storage time indicates a time of the to-be-delivered goods being stored in the receiving bin.

At step S5042, according to the storage time of the to-be-delivered goods temporarily stored in each of the at least one receiving bin, the target goods currently to be delivered by the target delivery robot are determined from the to-be-delivered goods temporarily stored in the at least one receiving bin.

In this embodiment, according to the storage time of the to-be-delivered goods stored in each of receiving bins, the target goods currently to be delivered by the target delivery robot are determined, which can avoid an undesirable long storage time of the to-be-delivered goods in the receiving bin, thus avoiding the problem of complaints from the consignee due to not receiving the to-be-delivered goods for a long time and improving the user experience.

In examples, after the container body stores each of the to-be-delivered goods in the receiving bin, it can begin to record the storage time of the each of the to-be-delivered goods. Assuming that the target delivery robot can only deliver one target goods at a time, that is, the target delivery robot is provided with one goods storage bin. When the container body determines that the target delivery robot is idle, it can determine F receiving bins, which are placed with goods, in the at least one receiving bin, that is, F non-idle receiving bins, and then obtain the storage time of the to-be-delivered goods stored in each of the F receiving bins, and determine the to-be-delivered goods with the longest storage time as the target goods currently to be delivered by the target delivery robot. The F is an integer greater than or equal to 1.

Alternatively, if the target delivery robot can deliver N target goods at a time, that is, the target delivery robot is provided with N goods storage bins, and the N is an integer greater than or equal to 2. When the container body determines that the target delivery robot is idle, it can determine the F receiving bins, which are placed with goods, from the at least one receiving bin, and then obtain the storage time of the to-be-delivered goods stored in each of the F receiving bins, and sort the F to-be-delivered goods according to the storage time from long to short, and then determine the first N to-be-delivered goods as the N target goods to be delivered by the target delivery robot. At this time, the container body can move the N target goods into the N goods storage bins provided to the target delivery robot sequentially, and obtain the order information of the N target goods respectively. After that, the container body can send a delivery instruction to the target delivery robot according to the order information of the N target goods, so that the target delivery robot can deliver each of the N target goods according to the order information of the N target goods in the delivery instruction.

Figure 5C:
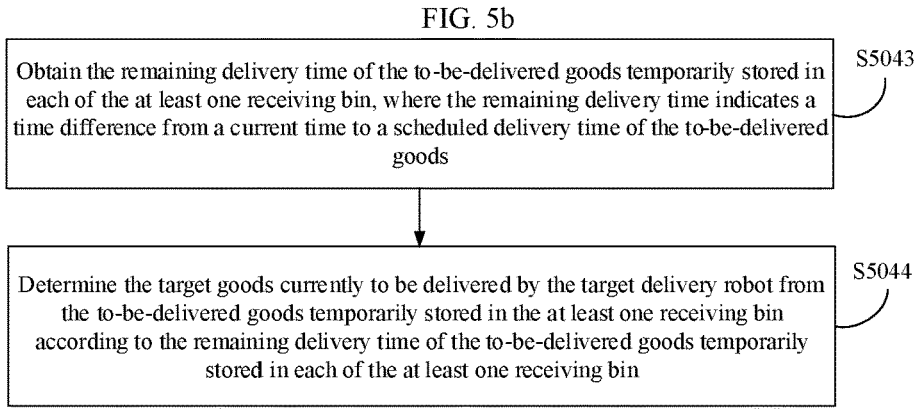

In an optional implementation of this embodiment, as shown in FIG. 5c, the step S504, that is, the step of determining the target goods currently to be delivered by the target delivery robot from the to-be-delivered goods temporarily stored in the at least one receiving bin. Including steps S5043 to S5044:

At step S5043, the remaining delivery time of the to-be-delivered goods temporarily stored in each of the at least one receiving bin is obtained, and the remaining delivery time indicates a time difference from a current time to a scheduled delivery time of the to-be-delivered goods.

At step S5044, according to the remaining delivery time of the to-be-delivered goods temporarily stored in each of the at least one receiving bin, the target goods currently to be delivered by the target delivery robot are determined from the to-be-delivered goods temporarily stored in the at least one receiving bin.

In this embodiment, the target goods currently to be delivered by the target delivery robot are determined according to the remaining delivery time of the to-be-delivered goods stored in each of the receiving bins, which can avoid the delivery timeout of the to-be-delivered goods and improve the user experience.

In examples, when the container body obtains the order information of each of the to-be-delivered goods, it can also obtain the remaining delivery time of each of the to-be-delivered goods at the same time, and update the remaining delivery time of each of the to-be-delivered goods in real time after each of the to-be-delivered goods is stored in the receiving bin. Assuming that the target delivery robot can only deliver one target goods at a time, that is, the target delivery robot is provided with one goods storage bin. When the container body determines that the target delivery robot is idle, it can determine F receiving bins, which are placed with goods, in the at least one receiving bin, and then obtain the remaining delivery time of the to-be-delivered goods stored in each of the F receiving bins, and determine the to-be-delivered goods with the shortest remaining delivery time as the target goods currently to be delivered by the target delivery robot.

Alternatively, if the target delivery robot can deliver N target goods at a time, that is, the target delivery robot is provided with N goods storage bins, and the N is an integer greater than or equal to 2. When the container body determines that the target delivery robot is idle, it can determine the F receiving bins, which are placed with goods, from the at least one receiving bin, and then obtain the remaining delivery time of the to-be-delivered goods stored in each of the F receiving bins, and sort the F to-be-delivered goods according to the remaining delivery time from short to long, and then determine the first N to-be-delivered goods as the N target goods to be delivered by the target delivery robot. At this time, the container body can move the N target goods into the N goods storage bins provided to the target delivery robot sequentially, and obtain the order information of the N target goods respectively. After that, the container body can send a delivery instruction to the target delivery robot according to the order information of the N target goods, so that the target delivery robot can deliver each of the N target goods according to the order information of the N target goods in the delivery instruction.

This embodiment of the present disclosure provides a delivery robot dispatching method. The container body can store goods to be delivered by the target delivery robot in the at least one receiving bin, and when the target delivery robot is idle, determine the target goods currently to be delivered by the target delivery robot from the to-be-delivered goods stored in the at least one receiving bin, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Sixth Embodiment

Figure 6:
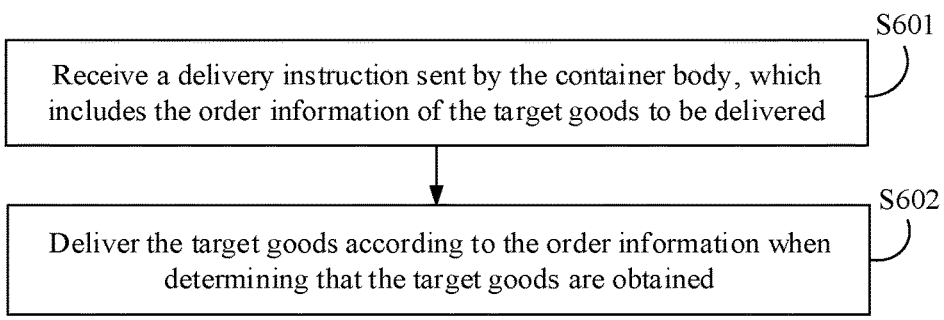
FIG. 6 shows a flowchart of a delivery robot dispatching method according to an embodiment of the present disclosure.

FIG. 6 shows a flowchart of a delivery robot dispatching method according to an embodiment of the present disclosure. This method is applied to the target delivery robot of the fourth embodiment above. As shown in FIG. 6, the delivery robot dispatching method includes the following steps S601 to S602:

At step S601, a delivery instruction sent by the container body is received, which includes the order information of the target goods to be delivered.

At step S602, when determining that the target goods are obtained, the target goods are delivered according to the order information.

In the related art, after the deliverer arrives at the destination, it can randomly hand over the goods to be delivered to any one of the delivery robots provided for the delivery site. However, if the delivery robots provided for the delivery site are all on the way to deliver goods when the deliverer arrives at the delivery site, the deliverer can only choose to wait or deliver the goods by itself, resulting in a reduction of the goods delivery efficiency of the deliverer.

Considering the above-mentioned defects, in this embodiment, a delivery robot dispatching method is proposed. In this method, the target delivery robot can receive the delivery instruction sent by the container body, and the delivery instruction includes the order information of the target goods to be delivered. Then, the delivery robot delivers the target goods according to the order information when determined that the target goods are obtained. Since a plurality of goods to be delivered by the target delivery robot are stored in the container body, the target delivery robot can deliver them sequentially according to instructions from the container body. It avoids the situation that when the target delivery robot is busy, the deliverers need to wait until the target delivery robot is idle so as to hand over the to-be-delivered goods to the target delivery robot, and thus the waiting time of the deliverer is shortened, and the goods delivery efficiency is improved.

The order information included in the delivery instruction may also include the contact information of the consignee of the target goods, that is, a mobile phone number or a fixed phone number. After the target delivery robot delivers the target goods to the destination, it can contact the consignee through this contact information, so that the consignee can pick up the goods in time.

In the process of delivering the target goods, the target delivery robot can obtain the current location coordinates in real time through its own GPS module, and send location feedback information to the container body according to the obtained location coordinates, so that the container body can obtain the current location of the target delivery robot in real time. Alternatively, the target delivery robot may also send location feedback information to the container body according to the location request information sent by the container body.

The target delivery robot is provided with at least one goods storage bin, which can be used to store the target goods to be delivered.

In an optional implementation of this embodiment, after receiving the delivery instruction sent by the container body, the target delivery robot can open the door of the goods storage bin. The container body can move the target goods to the goods storage bin through the transfer module. The target delivery robot can receive the target goods carried by the transfer module cooperating with the container body, and when detecting that the goods storage bin is placed with goods, determine that the target goods to be delivered by it are obtained. At this time, the target delivery robot can close the goods storage bin and deliver the target goods according to the order information of the target goods.

This embodiment of the present disclosure provides a delivery robot dispatching method. The container body can store goods to be delivered by the target delivery robot in the at least one receiving bin, and the target delivery robot can sequentially deliver the to-be-delivered goods temporarily stored in the at least one receiving bin according to instructions from the container body. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Seventh Embodiment

The seventh embodiment of the present disclosure is an apparatus embodiment, which can be used to perform the steps included in the method of the second embodiment of the present disclosure, that is, the delivery robot dispatching apparatus of the seventh embodiment can be provided in the container body of any implementation of the second embodiment.

Figure 7A:
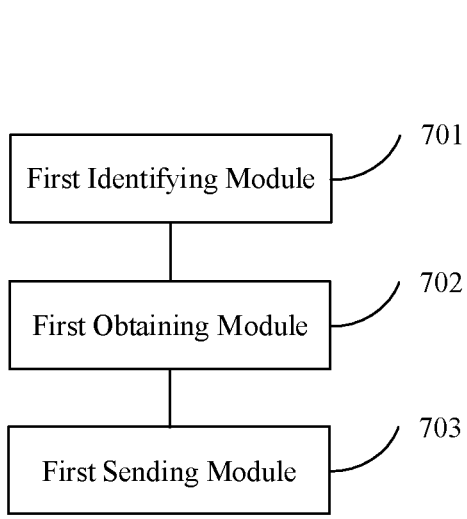
FIGS. 7a, 7b, 7e, and 7g respectively show a structural block diagram of a delivery robot dispatching apparatus according to different embodiments of the present disclosure.

FIG. 7a shows a structural block diagram of a delivery robot dispatching apparatus according to an embodiment of the present disclosure. The apparatus may be implemented as part or all of an electronic device through software, hardware or a combination of both. As shown in FIG. 7a, the delivery robot dispatching apparatus includes:

A first identifying module 701 is configured to identify a target delivery robot, and determine a target cabinet group corresponding to the target delivery robot;

A first obtaining module 702 is configured to obtain the order information of the target goods stored in the target cabinet group, and the target delivery robot is any one of the M delivery robots;

A first sending module 703 is configured to send a delivery instruction to the target delivery robot according to the order information of the target goods, so that the target delivery robot can deliver the target goods according to the order information after obtaining the target goods.

In the related art, each area can be set with one or more delivery sites, and each delivery site can be provided with one or more delivery robots. After a deliverer arrives at the destination, it can find a delivery site near the destination, and then hand over the goods to be delivered to the delivery robot of the delivery site, and the delivery robot will deliver the goods to the customer. However, if one or more delivery robots provided for the delivery site are all on the way to deliver the goods when the deliverer arrives at the delivery site, the deliverer can only choose to wait or deliver the goods by itself, resulting in a reduction of the goods delivery efficiency of the deliverer.

In consideration of the above-mentioned defects, in this embodiment, a delivery robot dispatching apparatus is proposed. The apparatus can store a plurality of goods to be delivered by the target delivery robot in the target cabinet group corresponding to the target delivery robot. When the target delivery robot is idle, the first identifying module 701 can identify the target delivery robot, and determine the target goods currently to be delivered by the target delivery robot from the to-be-delivered goods stored in the target cabinet group. The first obtaining module 702 can obtain the order information of the target goods, after that, the first sending module 703 can instruct the target delivery robot to deliver the target goods by sending the delivery instruction. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved. Specifically, a deliverer in an embodiment of the present disclosure may be a natural person who can deliver goods independently, or may be an unmanned device with a delivery function, etc., which is not limited in this embodiment of the present disclosure.

The order information may also include the contact information of the target goods consignee, that is, the mobile phone number or fixed telephone number. After the target delivery robot delivers the target goods to the destination, it can contact the consignee through the contact information to facilitate the consignee to pick up the goods in time.

Taking storing the to-be-delivered goods in the target cabinet group corresponding to the target delivery robot as an example, when the apparatus obtains the order information of the to-be-delivered goods and determines that the to-be-delivered goods are stored in the target cabinet group, the correspondence between the cabinet and the order information of the to-be-delivered goods can be saved. When the first identifying module 701 of the apparatus identifies the target delivery robot, and determines the to-be-delivered goods as the target goods to be delivered by the target delivery robot, the first obtaining module 702 can obtain the order information of the target goods according to the correspondence between the cabinet and the order information of the to-be-delivered goods, then the first sending module 703 send a delivery instruction to the target delivery robot according to the order information, so that the target delivery robot can deliver the target goods according to the order information included in the delivery instruction after obtaining the target goods.

In an optional implementation of this embodiment, the apparatus can obtain the location of each of the M delivery robots connected to it in real time, and then determine whether the each of the delivery robots moves to the corresponding parking site according to the location of the each of the delivery robots. If a delivery robot moves to the corresponding parking site, it means that the delivery robot has completed its last delivery and is currently in an idle stage. At this time, the first identifying module 701 can identify the delivery robot, that is, determine the cabinet group corresponding to the delivery robot. Taking the target delivery robot as an example, the first identifying module 701 identifies the delivery robot which is currently returning to the parking site as the target delivery robot, and then determines the target goods currently to be delivered by the target delivery robot from the to-be-delivered goods stored in the cabinet group corresponding to the target delivery robot, the target goods may be one to-be-delivered goods stored in the target cabinet group, or may be a plurality of to-be-delivered goods stored in the target cabinet group, which is not limited in this embodiment of the present disclosure. After the target goods are determined, the first obtaining module 702 can obtain the order information of the target goods, and move the target goods to the goods storage bin of the target delivery robot. The first sending module 703 sends the delivery instruction to the target delivery robot according to the order information of the target goods. The target delivery robot delivers the target goods according to the order information of the target goods included in the received delivery instruction.

Figure 7B:
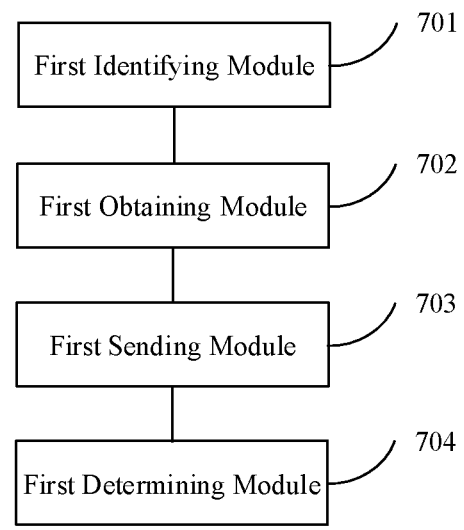

In an optional implementation of this embodiment, as shown in FIG. 7b, the apparatus further includes a first determining module 704. The first determining module 704 is configured to determine the target goods from the to-be-delivered goods stored in the at least one cabinet included in the target cabinet group.

Optionally, the first determining module 704 may determine the to-be-delivered goods stored in any one of the at least one cabinet as the target goods to be delivered by the target delivery robot, or the container body can determine, according to a preset order, the to-be-delivered goods stored in the first ranked cabinet among a plurality of non-idle cabinets included in the target cabinet group as the target goods to be delivered by the target delivery robot.

Figure 7C:
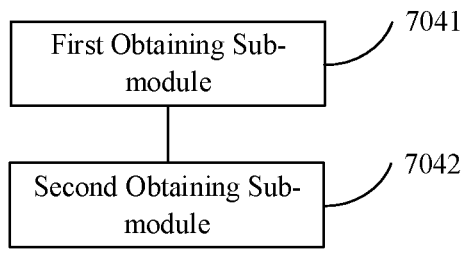
FIGS. 7c and 7d show a first determining module 704 according to different embodiments shown in FIG. 7b.

In an optional implementation of this embodiment, as shown in FIG. 7c, the first determining module 704 includes:

A first obtaining sub-module 7041 is configured to obtain the storage time of the to-be-delivered goods stored in each of the at least one cabinet included in the target cabinet group. The storage time indicates a time of the to-be-delivered goods being stored in the cabinet.

A second obtaining sub-module 7042 is configured to determine the target goods currently to be delivered by the target delivery robot from the to-be-delivered goods stored in the at least one cabinet according to the storage time of the to-be-delivered goods stored in each of the cabinets.

In this embodiment, according to the storage time of the to-be-delivered goods stored in each of the cabinets, the target goods currently to be delivered by the target delivery robot are determined, which can avoid an undesirable long storage time of the to-be-delivered goods in the cabinet, thus avoiding the problem of complaints from the consignee due to not receiving the to-be-delivered goods for a long time and improving the user experience.

In examples, for each of the to-be-delivered goods, the apparatus can begin to record the storage time of each of the to-be-delivered goods when it is placed in the cabinet. Assuming that the target delivery robot can only deliver one target goods at a time, that is, the target delivery robot is provided with one goods storage bin. When determining that the target delivery robot is idle, the first obtaining sub-module 7041 can determine E cabinets, which are placed with to-be-delivered goods, among the at least one cabinet included in the target cabinet group corresponding to the target delivery robot, that is, the non-idle E cabinets, and then obtain the storage time of the to-be-delivered goods stored in each of the E cabinets. The second obtaining sub-module 7042 can determine the to-be-delivered goods with the longest storage time as the target goods currently to be delivered by the target delivery robot, and E is an integer greater than or equal to 1.

Alternatively, if the target delivery robot can deliver N target goods at a time, that is, the target delivery robot is provided with N goods storage bins, and the N is an integer greater than or equal to 2. When determining that the target delivery robot is idle, the first obtaining sub-module 7041 can determine the E cabinets, which are placed with goods, among the at least one cabinet included in the cabinet group corresponding to the target delivery robot, and then obtain the storage time of the to-be-delivered goods stored in each of the E cabinets, and sort the to-be-delivered goods according to the storage time from long to short. The second obtaining sub-module 7042 can determine the first N to-be-delivered goods as the N target goods to be delivered by the target delivery robot. At this time, the apparatus can sequentially move the N target goods into the N goods storage bins provided to the target delivery robot, and obtain the order information of the N target goods respectively, and then send a delivery instruction to the target delivery robot according to the order information of the N target goods, so that the target delivery robot can deliver each of the N target goods according to the order information of the N target goods in the delivery instruction.

Figure 7D:
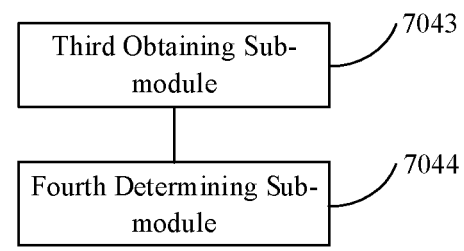

In an optional implementation of this embodiment, as shown in FIG. 7d, the first determining module 704 includes:

A third obtaining sub-module 7043 is configured to obtain the remaining delivery time of the to-be-delivered goods stored in each of the at least one cabinet included in the target cabinet group, where the remaining delivery time indicates a time difference from a current time to a scheduled delivery time of the to-be-delivered goods.

A fourth determining sub-module 7044 is configured to determine the target goods currently to be delivered by the target delivery robot from the to-be-delivered goods stored in the at least one cabinet according to the remaining delivery time of the to-be-delivered goods stored in each of the cabinets.

In this embodiment, the target goods currently to be delivered by the target delivery robot are determined according to the remaining delivery time of the to-be-delivered goods stored in each of the cabinets, which can avoid the delivery timeout of the to-be-delivered goods and improve the user experience.

In examples, when the apparatus obtains the order information of each of the to-be-delivered goods, it can also obtain the remaining delivery time of each of the to-be-delivered goods at the same time, and update the remaining delivery time of each of the to-be-delivered goods in real time after each of the to-be-delivered goods is stored in the cabinet. Assuming that the target delivery robot can deliver only one target goods at a time, that is, the target delivery robot is provided with one goods storage bin. When determining that the target delivery robot is idle, the third obtaining sub-module 7043 can determine E cabinets, which are placed with to-be-delivered goods, among the at least one cabinet included in the target cabinet group corresponding to the target delivery robot, and then obtain the remaining delivery time of the to-be-delivered goods stored in each of the E cabinets. The fourth determining module 7044 can determine the to-be-delivered goods with the shortest remaining delivery time as the target goods currently to be delivered by the target delivery robot.

Alternatively, if the target delivery robot can deliver N target goods at a time, that is, the target delivery robot is provided with N goods storage bins, When determining that the target delivery robot is idle, the third obtaining sub-module 7043 can determine the E cabinets, which are placed with goods, among the at least one cabinet included in the cabinet group corresponding to the target delivery robot, and then obtain the remaining delivery time of the to-be-delivered goods stored in each of the E cabinets, and sort the to-be-delivered goods according to the remaining delivery time from short to long. The fourth determining sub-module 7044 can determine the first N to-be-delivered goods as the N target goods to be delivered by the target delivery robot. At this time, the apparatus can sequentially move the N target goods into the N goods storage bins provided to the target delivery robot, and obtain the order information of the N target goods respectively, and then send a delivery instruction to the target delivery robot according to the order information of the N target goods, so that the target delivery robot can deliver each of the N target goods according to the order information of the N target goods in the delivery instruction.

In an optional implementation of this embodiment, the unmanned delivery device further includes a transfer module, and the apparatus further includes a first transferring module 705. The first transferring module 705 is configured to automatically transfer the target goods to the target delivery robot through the transfer module.

After determining the target goods, the first transferring module 705 can instruct the goods storage bin of the target delivery robot to open, and then move the target goods to the goods storage bin of the target delivery robot through the transfer module. Then the first sending module 703 send a delivery instruction to the target delivery robot according to the order information of the target goods. After determining that the target goods are placed in the goods storage bin, the target delivery robot can close the door of the goods storage bin, and deliver the target goods according to the order information of the target goods included in the received delivery instruction.

Figure 7E:
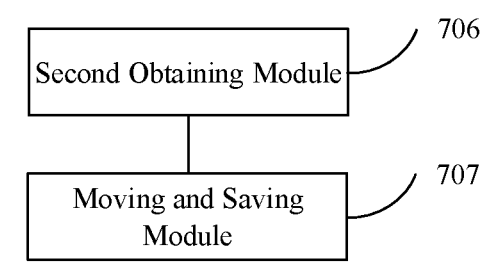

In an optional implementation of this embodiment, as shown in FIG. 7e, the apparatus further includes a second obtaining module 706, and a moving and saving module 707.

The second obtaining module 706 is configured to obtain the order information of the first to-be-delivered goods, and determine the first delivery robot for delivering the first to-be-delivered goods from the M delivery robots according to the order information of the first to-be-delivered goods.

The moving and saving module 707 is configured to move the first to-be-delivered goods to the first cabinet group corresponding to the first delivery robot for temporary storage, and save the correspondence between the order information of the first to-be-delivered goods and the first cabinet group.

In this embodiment, when determining that the first to-be-delivered goods are to be delivered, the second obtaining module 706 can determine the first delivery robot for delivering the first-to-be-delivered goods. The moving and saving module 707 stores the first to-be-delivered goods in the first cabinet group corresponding to the first to-be-delivered goods. In this way, the waiting time of the deliverer is shortened, and the goods delivery efficiency is improved.

The transportation characteristic of the first to-be-delivered goods can include cold-chain transportation and hot-chain transportation; the dimensional characteristic of the first to-be-delivered goods can include large size good, medium size good, and small size.

In examples, different delivery robots are responsible for different delivery areas. When the deliverer carrying the first to-be-delivered goods arrives near the unmanned delivery device, if the M delivery robots are on the way of delivering other goods, the second obtaining module 706 can obtain the order information of the first to-be-delivered goods, and then identify one or more delivery robots responsible for the delivery area indicated by the order information from the M delivery robots according to the order information of the first to-be-delivered goods. If only one of the M delivery robots is responsible for the delivery area indicated by the order information, the second obtaining module 706 confirms that the only one delivery robot is the first delivery robot. After determining the first delivery robot for delivering the first to-be-delivered goods, the moving and saving module 707 can store the first to-be-delivered goods in the first cabinet group corresponding to the first delivery robot, and save the correspondence between the order information of the first to-be-delivered goods and the first cabinet group when detecting that the first to-be-delivered goods are placed in the first cabinet group.

If at least two of the M delivery robots are responsible for the delivery area indicated by the order information, the second obtaining module 706 can also obtain the characteristic of the first to-be-delivered goods according to the order information of the first to-be-delivered goods, and then determine the first delivery robot for delivering the first to-be-delivered goods from the at least two delivery robots responsible for the delivery area indicated by the order information according to the characteristics. For example, if the at least two delivery robots responsible for the delivery area indicated by the order information include a delivery robot responsible for cold-chain transportation and a delivery robot responsible for hot-chain transportation, and the characteristic of the first to-be-delivered goods indicates that the transportation characteristic of the first to-be-delivered goods is cold-chain transportation, the second obtaining module 706 can determine the first delivery robot for delivering the first to-be-delivered goods from the at least two delivery robots responsible for the delivery area indicated by the order information, which is responsible for cold-chain transportation. If the characteristic of the first to-be-delivered goods indicates that the transportation characteristic of the first to-be-delivered goods is hot-chain transportation, the second obtaining module 706 can determine the first delivery robot for delivering the first to-be-delivered goods from the at least two delivery robots responsible for the delivery area indicated by the order information, which is responsible for hot-chain transportation. If the at least two delivery robots responsible for the delivery area indicated by the order information include a delivery robot responsible for transporting large-size goods and a delivery robot responsible for transporting small-size goods, and the characteristic of the first to-be-delivered goods indicates that the dimensional characteristic of the first to-be-delivered goods is large-size, the second obtaining module 706 can determine the first delivery robot for delivering the first to-be-delivered goods from the at least two delivery robots responsible for the delivery area indicated by the order information, which is responsible for transporting large-size goods. If the characteristic of the first to-be-delivered goods indicates that the dimensional characteristic of the first to-be-delivered goods is small-size, the second obtaining module 706 can determine the first delivery robot for delivering the first to-be-delivered goods from the at least two delivery robots responsible for the delivery area indicated by the order information, which is responsible for transporting small-size goods.

In examples, different delivery robots have different transportation characteristics, and the transportation characteristic may be cold-chain transportation or hot-chain transportation. When the deliverer carrying the first to-be-delivered goods arrives near the unmanned delivery device, if the M delivery robots are on the way of delivering other goods, the second obtaining module 706 can obtain the order information of the first to-be-delivered goods, and then obtain the characteristic of the first to-be-delivered goods according to the order information, and identify one or more delivery robots with the same transportation characteristic as the transportation characteristic of the first to-be-delivered goods from the M delivery robots according to the characteristic of the first to-be-delivered goods. If only one of the M delivery robots has the same transportation characteristic as the transportation characteristic of the first to-be-delivered goods, the second obtaining module 706 confirms that the only one delivery robot is the first delivery robot. At this time, the moving and saving module 707 can store the first to-be-delivered goods in the first cabinet group corresponding to the first delivery robot, and save the correspondence between the order information of the first to-be-delivered goods and the first cabinet group when detecting that the first to-be-delivered goods are placed in the first cabinet group.

If at least two of the M delivery robots have the same transportation characteristic as the transportation characteristic of the first to-be-delivered goods, and the at least two delivery robots with the same transportation characteristic as the transportation characteristic of the first to-be-delivered goods are responsible for different delivery areas respectively, the second obtaining module 706 can also determine the first delivery robot for delivering the first to-be-delivered goods from the at least two delivery robots with the same transportation characteristic as the transportation characteristic of the first to-be-delivered goods, according to the delivery address included in the order information of the first to-be-delivered goods.

In examples, different delivery robots are responsible for transporting different size goods. When the deliverer carrying the first to-be-delivered goods arrives near the unmanned delivery device, if the M delivery robots are on the way of delivering other goods, the second obtaining module 706 can obtain the order information of the first to-be-delivered goods, obtain the characteristic of the first to-be-delivered goods according to the order information, and then identify, according to the characteristic of the first to-be-delivered goods, one or more delivery robots which are responsible for transporting goods matching the dimensional characteristic of the first to-be-delivered goods from the M delivery robot. If only one of the M delivery robots is responsible for transporting goods matching the dimensional characteristic of the first to-be-delivered goods, the second obtaining module 706 confirms that the only one delivery robot is the first delivery robot. At this time, the moving and saving module 707 can store the first to-be-delivered goods in the first cabinet group corresponding to the first delivery robot, and save the correspondence between the order information of the first to-be-delivered goods and the first cabinet group when detecting that the first to-be-delivered goods are placed in the first cabinet group.

If at least two of the M delivery robots are responsible for transporting goods matching the dimensional characteristic of the first to-be-delivered goods, and the at least two delivery robots responsible for transporting goods matching the dimensional characteristic of the first to-be-delivered goods are responsible for different delivery areas respectively, the second obtaining module 706 can also determine the first delivery robot for delivering the first to-be-delivered goods from the at least two delivery robots, which are responsible for transporting goods matching the dimensional characteristic of the first to-be-delivered goods, according to the delivery address included in the order information of the first to-be-delivered goods.

Figure 7F:
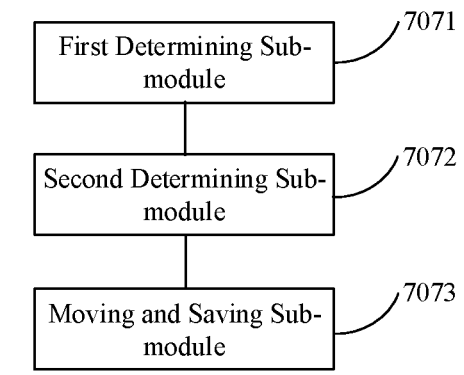
FIG. 7f shows a structural block diagram of a moving and saving module 707 according to the embodiment shown in FIG. 7e.

In an optional implementation of this embodiment, as shown in FIG. 7f, each of cabinet group includes various cabinets to store to-be-delivered goods with different characteristics. The moving and saving module 707 includes:

A first determining sub-module 7071 is configured to determine the characteristic of the first to-be-delivered goods based on the order information of the first to-be-delivered goods, and the characteristic includes the transportation characteristic or the dimensional characteristic of the first to-be-delivered goods.

A second determining sub-module 7072 is configured to determine the first cabinet for storing the first to-be-delivered goods from the at least one cabinet included in the first cabinet group according to the characteristic of the first to-be-delivered goods.

A moving and saving sub-module 7073 is configured to move the first to-be-delivered goods to the first cabinet included in the first cabinet group for temporary storage, and save the correspondence between the order information of the first to-be-delivered goods and the first cabinet.

In examples, the first determining sub-module 7071 can obtain the order information of the first to-be-delivered goods firstly, then according to the characteristic of the first to-be-delivered, the second determining sub-module 7072 determines the first cabinet for storing the first to-be-delivered goods from the at least one cabinet included in the first cabinet group corresponding to the first delivery robot as the first cabinet for storing the first to-be-delivered goods, and then the moving and saving sub-module 7073 instructs the door of the first cabinet to open, and moves the first to-be-delivered goods to the first cabinet. When detecting that the first to-be-delivered goods are placed in the first cabinet, the moving and saving sub-module 7073 saves the correspondence between the order information of the first to-be-delivered goods and the first cabinet.

Optionally, according to the characteristic of the first to-be-delivered, the second determining sub-module 7072 can determine the first cabinet for storing the first to-be-delivered goods from the at least one cabinet included in the first cabinet group corresponding to the first delivery robot. That is, if the characteristic of the first to-be-delivered goods indicates that the first to-be-delivered goods require cold-chain transportation, the second determining sub-module 7072 determines a cabinet capable of cold-chain storage among the at least one cabinet included in the first cabinet group corresponding to the first delivery robot as the first cabinet for storing the first to-be-delivered goods; or if the characteristic of the first to-be-delivered goods indicates that the first to-be-delivered goods require hot-chain transportation, the second determining sub-module 7072 determines a cabinet capable of hot-chain storage among the at least one cabinet included in the first cabinet group corresponding to the first delivery robot as the first cabinet for storing the first to-be-delivered goods; or if the characteristic of the first to-be-delivered goods indicates that the first to-be-delivered goods are large-sized goods, the second determining sub-module 7072 determines a cabinet capable of storing large-sized goods among the at least one cabinet included in the first cabinet group corresponding to the first delivery robot as the first cabinet for storing the first to-be-delivered goods. For goods of other sizes, please refer to the storage of the large-size goods described above, which is not described in detail in this embodiment of the present disclosure.

In an optional implementation of this embodiment, the apparatus further includes a recording module 708. The recording module 708 is configured to begin to record the storage time of the first to-be-delivered goods stored in the first cabinet, when detecting that the first to-be-delivered goods are placed in the first cabinet.

In examples, the recording module 708 can begin to record the storage time of the first to-be-delivered goods stored in the first cabinet, when detecting that the first to-be-delivered goods are placed in the first cabinet. In this way, when determining that the first delivery robot is idle, the apparatus can obtain the storage time of the first to-be-delivered goods stored in the first cabinet, and then determine whether the first to-be-delivered goods are the target goods according to the storage time.

In an optional implementation of this embodiment, the apparatus further includes a third obtaining module 709 and a updating module 710.

The third obtaining module 709 is configured to obtain the remaining delivery time of the first to-be-delivered goods.

The updating module 710 is configured to update the remaining delivery time of the first to-be-delivered goods in real time, after detecting that the first to-be-delivered goods are placed in the first cabinet.

In examples, when obtaining the order information of the first to-be-delivered goods, the third obtaining module 709 can also obtain the remaining delivery time of the first to-be-delivered goods at the same time. After detecting that the first to-be-delivered goods are placed in the first cabinet, the updating module 710 can update the remaining delivery time of the first to-be-delivered goods in real time. In this way, when determining that the first delivery robot is idle, the apparatus can obtain the remaining delivery time of the first to-be-delivered goods stored in the first cabinet, and then determine whether the first to-be-delivered goods are the target goods according to the remaining delivery time.

Figure 7G:
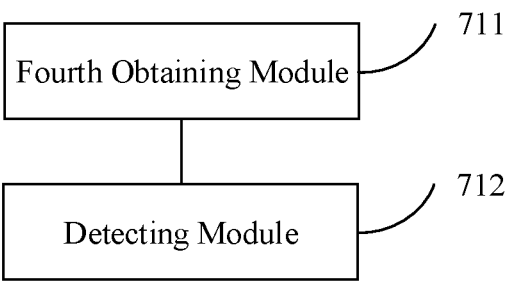

In an optional implementation of this embodiment, as shown in FIG. 7g, the container body is further provided with at least one receiving bin, and the receiving bin is configured to temporarily store to-be-delivered goods; the apparatus further includes a fourth obtaining module 711 and a detecting module 712.

The fourth obtaining module 711 is configured to obtain the first receiving bin for temporarily storing the first to-be-delivered goods from the at least one receiving bin according to the order information of the first to-be-delivered goods.

The detecting module 712 is configured to perform the step configured in the second obtaining module when detecting that the first to-be-delivered goods are placed in the first receiving bin.

In examples, when a deliverer arrives near the container body, if all M delivery robots are on the way of delivery, the deliverer can firstly input the order information of the to-be-delivered goods on the container body. The container body can determine the delivery robot for delivering the to-be-delivered goods from the M delivery robots according to the order information, and temporarily store the to-be-delivered goods, so as to instruct the delivery robot to deliver the to-be-delivered goods after the delivery robot returns. Assuming that the container body is not provided with such receiving bins, the container body will instruct the deliverer to place the to-be-delivered goods into the cabinet group corresponding to the delivery robot. If the cabinet group instructed by the container body is far away from the deliverer, the deliverer needs to walk to the cabinet group to store the to-be-delivered goods, which virtually wastes the delivery time of the deliverer. The receiving bins can be provided below the display screen of the container body, that is, after determining that the deliverer has inputted the order information of the to-be-delivered goods, the container body can promptly instruct the receiving bin to open, the deliverer can leave after placing the to-be-delivered goods into the receiving bin, then the container body and the transfer module cooperate to move the to-be-delivered goods to the appropriate cabinet group. In this way, the delivery time of the deliverer is further saved, and the user experience is better.

In examples, different receiving bins correspond to different transportation characteristics, and the transportation characteristic may be cold-chain transportation or hot-chain transportation. When the deliverer carrying the first to-be-delivered goods arrives near the unmanned delivery device, if the M delivery robots are on the way of delivering other goods, the fourth obtaining module 711 can obtain the characteristic of the first to-be-delivered goods included in the order information of the first to-be-delivered goods, and then determine the receiving bin with the same transportation characteristic as the transportation characteristic of the first to-be-delivered goods from the at least one receiving bin according to the characteristic of the first to-be-delivered goods. This receiving bin is the first receiving bin.

In examples, different receiving bins correspond to different goods sizes, and the goods sizes may be large-size goods, medium-size goods, or small-size goods. When the deliverer carrying the first to-be-delivered goods arrives near the unmanned delivery device, if the M delivery robots are on the way of delivering other goods, the fourth obtaining module 711 can obtain the characteristic of the first to-be-delivered goods included in the order information of the first to-be-delivered goods, and then determine the receiving bin corresponding to the goods matching the dimensional characteristic of the first to-be-delivered goods from the at least one receiving bin, according to the characteristic of the first to-be-delivered goods. This receiving bin is the first receiving bin.

In practical application, there may also be situations where different receiving bins correspond to different areas. When the deliverer carrying the first to-be-delivered goods arrives near the unmanned delivery device, if the M delivery robots are on the way of delivering other goods, the fourth obtaining module 711 can obtain the delivery address included in the order information of the first to-be-delivered goods, and then determine the receiving bin corresponding to the same area as the area indicated by the order information from the at least one receiving bin according to the delivery address. This receiving bin is the first receiving bin.

After the first receiving bin for temporarily storing the first to-be-delivered goods is determined, the container body may instruct the door of the first receiving bin to open. When the deliverer observes that the door of the first receiving bin is opened, it can place the first to-be-delivered goods into the first receiving bin. After determining that the bin door closing instruction is received, the detecting module 712 can instruct the door of the first receiving bin to close. Specifically, after placing the to-be-delivered goods into the first receiving bin, the deliverer can input the bin door closing instruction by clicking the confirm button on the container body. Optionally, the deliverer can also send the bin door closing instruction through the mobile phone. Optionally, the detecting module 712 can automatically detect whether the first to-be-delivered goods are placed in the first receiving bin, and confirm that the bin door closing instruction is obtained when detecting that the first to-be-delivered goods are stored in the first receiving bin. At this time, the detecting module 712 instructs the apparatus to perform the step configured in the second obtaining module 706, that is, identifying the first delivery robot for delivering the first to-be-delivered goods from the M delivery robots according to the order information of the first to-be-delivered goods, storing the first to-be-delivered goods in the first cabinet group corresponding to the first delivery robot, and saving the correspondence between the order information of the first to-be-delivered goods and the first cabinet group.

This embodiment of the present disclosure provides a delivery robot dispatching method, where the apparatus can store a plurality of goods to be delivered by the target delivery robot in the target cabinet group corresponding to the target delivery robot, and when the target delivery robot is idle, determine the target goods currently to be delivered by the target delivery robot from the to-be-delivered goods stored in the cabinet group, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Eighth Embodiment

The eighth embodiment of the present disclosure is an apparatus embodiment, which can be used to perform the steps included in the method of the third embodiment of the present disclosure, that is, the delivery robot dispatching apparatus of the eighth embodiment can be provided in the target delivery robot of any implementation of the third embodiment.

Figure 8:
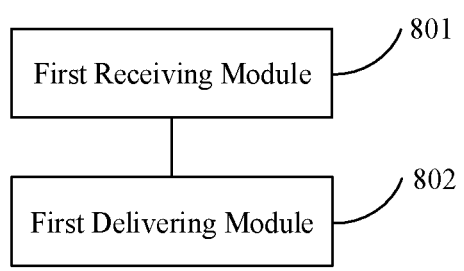
FIG. 8 shows a structural block diagram of a delivery robot dispatching apparatus according to an embodiment of the present disclosure.

FIG. 8 shows a structural block diagram of a delivery robot dispatching apparatus according to an embodiment of the present disclosure. The apparatus may be implemented as part or all of an electronic device through software, hardware or a combination of both. As shown in FIG. 8, the delivery robot dispatching apparatus includes a first receiving module 801 and a first delivering module 802.

The first receiving module 801 is configured to receive a delivery instruction sent by the container body, and the delivery instruction includes order information of the target goods to be delivered.

The first delivering module 802 is configured to deliver the target goods according to the order information when determining that the target goods are obtained.

In the related art, after a deliverer arrives at the destination, it can randomly hand over the goods to be delivered to any one of the delivery robots provided for the delivery site. However, if the delivery robots provided for the delivery site are all on the way to deliver goods when the deliverer arrives at the delivery site, the deliverers can only choose to wait or deliver the goods by itself, resulting in a reduction of the goods delivery efficiency of the deliverer.

Considering the above-mentioned defects, in this embodiment, a delivery robot dispatching apparatus is proposed. The first receiving module 801 of the apparatus can receive the delivery instruction sent by the container body. The delivery instruction includes the order information of the target goods to be delivered. The first delivering module 802 delivers the target goods according to the order information when determining that the target goods are obtained. Since a plurality of goods to be delivered by the target delivery robot are stored in the container body, the apparatus can instruct the target delivery robot to deliver them sequentially according to the instructions from the container body. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The order information included in the delivery instruction may also include the contact information of the consignee of the target goods, that is, a mobile phone number or a fixed phone number. After the target delivery robot delivers the target goods to the destination, it can contact the consignee through this contact information, so that the consignee can pick up the goods in time.

In the process of delivering the target goods, the apparatus can obtain the current location coordinates in real time through its own GPS module, and send location feedback information to the container body according to the obtained location coordinates, so that the container body can obtain the current location of the apparatus in real time. Alternatively, the apparatus may also send location feedback information to the container body according to the location request information sent by the container body.

The apparatus is provided with at least one goods storage bin, which can be used to store the target goods to be delivered.

In an optional implementation of this embodiment, the apparatus further includes a second receiving module 803. The second receiving module 803 is configured to receive the target goods carried by a transfer module cooperating with the container body. Specifically, after receiving the delivery instruction sent by the container body, the first receiving module 801 of the apparatus can open the door of the goods storage bin. The container body can move the target goods into the goods storage bin through the transfer module, and the second receiving module 803 receives the target goods carried by the transfer module. When the first delivering module 802 determines that the goods storage bin is placed with goods, it determines to obtain the target goods to be delivered by it. At this time, the door of the goods storage bin can be closed, and then the target goods is delivered according to the order information of the target goods.

This embodiment of the present disclosure provides a delivery robot dispatching apparatus, where the container body can store a plurality of goods to be delivered by the target delivery robot in the target cabinet group corresponding to the target delivery robot, and the apparatus can instruct the target delivery robot to sequentially deliver the to-be-delivered goods stored in the target cabinet corresponding to it according to the instructions from the container body. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Ninth Embodiment

The ninth embodiment of the present disclosure is an apparatus embodiment, which can be used to perform the steps included in the method of the fifth embodiment of the present disclosure, that is, the delivery robot dispatching apparatus of the ninth embodiment can be provided in the container body of any implementation of the fifth embodiment.

Figure 9A:
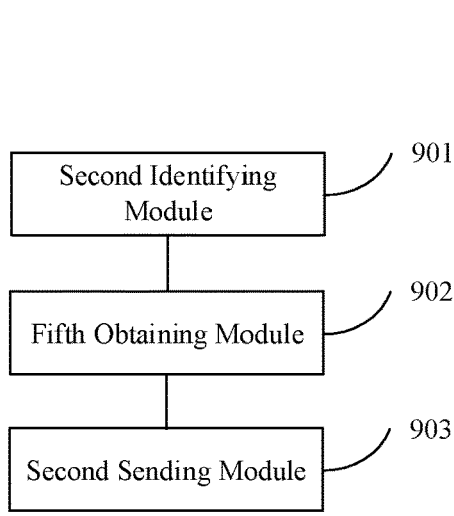
FIGS. 9a and 9b respectively show a structural block diagram of a delivery robot dispatching apparatus according to different embodiments of the present disclosure.

FIG. 9a shows a structural block diagram of a delivery robot dispatching apparatus according to an embodiment of the present disclosure. The apparatus may be implemented as part or all of an electronic device through software, hardware or a combination of both. As shown in FIG. 9a, the delivery robot dispatching apparatus includes a second identifying module 901, a fifth obtaining module 902, and a second sending module 903.

The second identifying module 901 is configured to identify the target delivery robot.

The fifth obtaining module 902 is configured to obtain the order information of the target goods that are temporarily stored in the receiving bin and to be delivered by the target delivery robot. The target delivery robot is any one of the M delivery robots, and the order information includes the delivery address of the target goods.

The second sending module 903 is configured to send a delivery instruction to the target delivery robot according to the order information. The delivery instruction includes the order information of the target goods, so that the target delivery robot can deliver the target goods according to the order information after obtaining the target goods.

In the related art, each area can be set with one or more delivery sites, and each delivery site can be provided with one or more delivery robots. After a deliverer arrives at the destination, it can find a delivery site near the destination, and then hand over the goods to be delivered to the delivery robot of the delivery site, and the delivery robot will deliver the goods to the customer. However, if one or more delivery robots provided for the delivery site are all on the way to deliver the goods when the deliverer arrives at the delivery site, the deliverer can only choose to wait or deliver the goods by itself, resulting in a reduction of the goods delivery efficiency of the deliverer.

Considering the above-mentioned defects, in this embodiment, a delivery robot dispatching apparatus is proposed. The apparatus can store goods to be delivered by the target delivery robot in the at least one receiving bin, and when the target delivery robot is idle, determine the target goods currently to be delivered by the target delivery robot from the to-be-delivered goods stored in the at least one receiving bin, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The order information may also include the contact information of the target goods consignee, that is, the mobile phone number or fixed telephone number. After the target delivery robot delivers the target goods to the destination, it can contact the consignee through the contact information to facilitate the consignee to pick up the goods in time.

After the to-be-delivered goods are stored in the receiving bin and the order information of the to-be-delivered goods is obtained, the apparatus can save the correspondence between the receiving bin and the order information of the to-be-delivered goods. When the fifth obtaining module 902 determines the to-be-delivered goods as the target goods to be delivered by the target delivery robot, the fifth obtaining module 902 can obtain the order information of the target goods according to the correspondence between the receiving bin and the order information of the to-be-delivered goods, then the second sending module 903 can send a delivery instruction to the target delivery robot according to the order information, so that the target delivery robot can deliver the target goods according to the order information included in the delivery instruction after obtaining the target goods.

In an optional implementation of this embodiment, the apparatus can obtain the location of each of the M delivery robots connected to it in real time, and then determine whether the each of the delivery robots moves to the corresponding parking site according to the location of the each of the delivery robots. If a delivery robot moves to the corresponding parking site, it means that the delivery robot has completed its last delivery and is currently in an idle stage. At this time, the second identifying module 901 can identify the delivery robot as the target delivery robot, and the fifth obtaining module 902 determines the target goods currently to be delivered by the target delivery robot from the to-be-delivered goods temporarily stored in the at least one receiving bin. The target goods can be one to-be-delivered goods stored in any receiving bin, or a plurality of to-be-delivered goods stored in the at least one receiving bin, which is not limited in this embodiment of the present disclosure. After the target goods are determined, the second sending module 903 can send a delivery instruction to the target delivery robot according to the order information of the target goods. The target delivery robot, after determining that the target goods are placed in the goods storage bin, may deliver the target goods according to the order information of the target goods included in the received delivery instruction.

In an optional implementation of this embodiment, the unmanned delivery device further includes a transfer module, and the apparatus further includes a second transferring module 905. The second transferring module 905 is configured to automatically transfer the target goods to the target delivery robot through the transfer module.

In examples, the target delivery robot is provided with a goods storage bin. After determining the target goods, the second transferring module 905 can instruct the goods storage bin of the target delivery robot to open, and then move the target goods temporarily stored in the receiving bin to the goods storage bin of the target delivery robot through the transfer module. At this time, the second sending module 903 can send a delivery instruction to the target delivery robot according to the order information of the target goods. The target delivery robot can receive the target goods carried by the transfer module, and after determining that the target goods are placed in the goods storage bin, close the door of the goods storage bin, and then deliver the target goods according to the order information of the target goods included in the received delivery instruction.

Figure 9B:
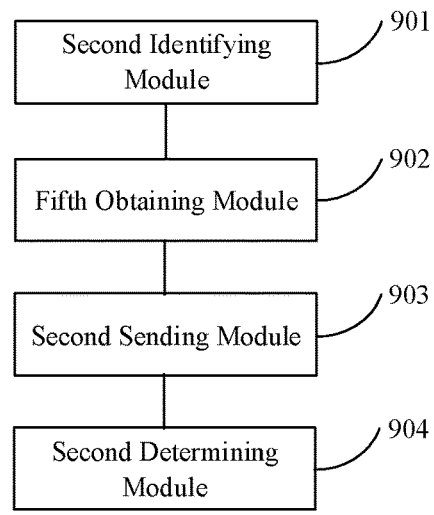

In an optional implementation of this embodiment, as shown in FIG. 9b, the apparatus further includes a second determining module 904, and the second determining module 904 is configured to determine the target goods currently to be delivered by the target delivery robot from the to-be-delivered goods temporarily stored in the at least one receiving bin.

Optionally, the second determining module 904 may determine the to-be-delivered goods stored in any one of the at least one receiving bin as the target goods to be delivered by the target delivery robot, or the second determining module 904 may determine, according to a preset order, the to-be-delivered goods stored in the first receiving bin among the at least one receiving bin as the target goods to be delivered by the target delivery robot.

Figure 9C:
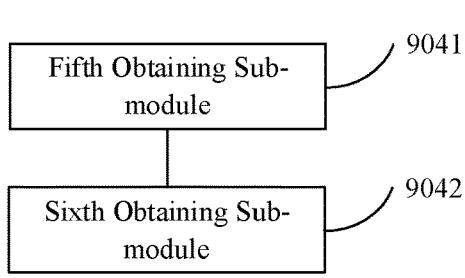
FIGS. 9c and 9d respectively show a structural block diagram of a second determining module 904 according to different embodiments shown in FIG. 9b.

In an optional implementation of this embodiment, as shown in FIG. 9c, the second determining module 904 includes a fifth obtaining sub-module 9041 and a sixth obtaining sub-module 9042.

The fifth obtaining sub-module 9041 is configured to obtain the storage time of the to-be-delivered goods temporarily stored in each of the at least one receiving bin. The storage time indicates a time of the to-be-delivered goods being stored in the receiving bin.

The sixth obtaining sub-module 9042 is configured to determine the target goods currently to be delivered by the target delivery robot from the to-be-delivered goods temporarily stored in the at least one receiving bin according to the storage time of the to-be-delivered goods temporarily stored in each of the at least one receiving bin.

In this embodiment, according to the storage time of the to-be-delivered goods stored in each of receiving bins, the target goods currently to be delivered by the target delivery robot are determined, which can avoid an undesirable long storage time of the to-be-delivered goods in the receiving bin, thus avoiding the problem of complaints from the consignee due to not receiving the to-be-delivered goods for a long time and improving the user experience.

In examples, for each of the to-be-delivered goods, the apparatus can begin to record the storage time of each of the to-be-delivered goods when it is placed in the receiving bin. Assuming that the target delivery robot can only deliver one target goods at a time, that is, the target delivery robot is provided with one goods storage bin. When determining that the target delivery robot is idle, the fifth obtaining sub-module 9041 can determine F receiving bins, which are placed with goods, among the at least one receiving bin, that is, F non-idle receiving bins, and then obtain the storage time of the to-be-delivered goods stored in each of the F receiving bins. The sixth obtaining sub-module 9042 can determine the to-be-delivered goods with the longest storage time as the target goods currently to be delivered by the target delivery robot. The F is an integer greater than or equal to 1.

Alternatively, if the target delivery robot can deliver N target goods at a time, that is, the target delivery robot is provided with N goods storage bins, and the N is an integer greater than or equal to 2. When determining that the target delivery robot is idle, the fifth obtaining sub-module 9041 can determine the F receiving bins, which are placed with goods, from the at least one receiving bin, and then obtain the storage time of the to-be-delivered goods stored in each of the F receiving bins, and sort the to-be-delivered goods according to the storage time from long to short. The sixth obtaining sub-module 9042 can determine the first N to-be-delivered goods as the N target goods to be delivered by the target delivery robot. At this time, the apparatus can sequentially move the N target goods into the N goods storage bins provided to the target delivery robot, and obtain the order information of the N target goods respectively, and then send a delivery instruction to the target delivery robot according to the order information of the N target goods, so that the target delivery robot can deliver each of the N target goods according to the order information of the N target goods in the delivery instruction.

Figure 9D:
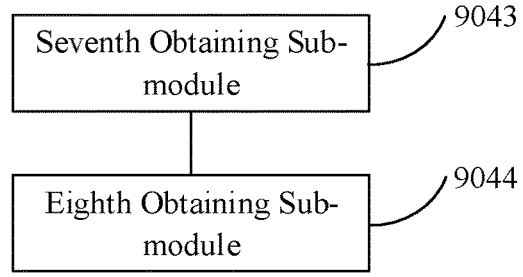

In an optional implementation of this embodiment, as shown in FIG. 9d, the second determining module 904 includes a seventh obtaining sub-module 9043 and a eighth obtaining sub-module 9044.

The seventh obtaining sub-module 9043 is configured to obtain the remaining delivery time of the to-be-delivered goods temporarily stored in each of the at least one receiving bin, and the remaining delivery time indicates a time difference from a current time to a scheduled delivery time of the to-be-delivered goods.

The eighth obtaining sub-module 9044 is configured to determine the target goods currently to be delivered by the target delivery robot from the to-be-delivered goods temporarily stored in the at least one receiving bin according to the remaining delivery time of the to-be-delivered goods temporarily stored in each of the at least one receiving bin.

In this embodiment, the target goods currently to be delivered by the target delivery robot are determined according to the remaining delivery time of the to-be-delivered goods stored in each of receiving bins, which can avoid the delivery timeout of the to-be-delivered goods and improve the user experience.

In examples, when the order information of each of the to-be-delivered goods is obtained, the seventh obtaining sub-module 9043 can also obtain the remaining delivery time of each of the to-be-delivered goods at the same time, and update the remaining delivery time of each of the to-be-delivered goods in real time after each of the to-be-delivered goods is stored in the receiving bin. Assuming that the target delivery robot can only deliver one target goods at a time, that is, the target delivery robot is provided with one goods storage bin. When determining that the target delivery robot is idle, the seventh obtaining sub-module 9043 can determine F receiving bins, which are placed with goods, in the at least one receiving bin, and then obtain the remaining delivery time of the to-be-delivered goods stored in each of the F receiving bins, the eighth obtaining sub-module 9044 can determine the to-be-delivered goods with the shortest remaining delivery time as the target goods currently to be delivered by the target delivery robot.

Alternatively, if the target delivery robot can deliver N target goods at a time, that is, the target delivery robot is provided with N goods storage bins. When determining that the target delivery robot is idle, the seventh obtaining sub-module 9043 can determine the F receiving bins, which are placed with goods, from the at least one receiving bin, and then obtain the remaining delivery time of the to-be-delivered goods stored in each of the F receiving bins, and sort the F to-be-delivered goods according to the remaining delivery time from short to long. The eighth obtaining sub-module 9044 can determine the first N to-be-delivered goods as the N target goods to be delivered by the target delivery robot. At this time, the apparatus can sequentially move the N target goods into the N goods storage bins provided to the target delivery robot, and obtain the order information of the N target goods respectively, and then send a delivery instruction to the target delivery robot according to the order information of the N target goods, so that the target delivery robot can deliver each of the N target goods according to the order information of the N target goods in the delivery instruction.

This embodiment of the present disclosure provides a delivery robot dispatching apparatus. The apparatus can store goods to be delivered by the target delivery robot in the at least one receiving bin, and when the target delivery robot is idle, determine the target goods currently to be delivered by the target delivery robot from the to-be-delivered goods stored in the at least one receiving bin, and then instruct the target delivery robot to deliver the target goods. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The Tenth Embodiment

The tenth embodiment of the present disclosure is an apparatus embodiment, which can be used to perform the steps included in the method of the sixth embodiment of the present disclosure, that is, the delivery robot dispatching apparatus of the tenth embodiment can be provided in the target delivery robot of any implementation of the sixth embodiment.

Figure 10:
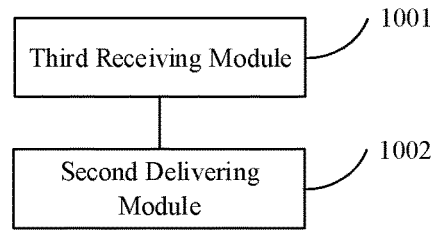
FIG. 10 shows a structural block diagram of a delivery robot dispatching apparatus according to an embodiment of the present disclosure.

FIG. 10 shows a structural block diagram of a delivery robot dispatching apparatus according to an embodiment of the present disclosure. The apparatus may be implemented as part or all of an electronic device through software, hardware or a combination of both. As shown in FIG. 10, the delivery robot dispatching apparatus includes a third receiving module 1001 and a second delivering module 1002.

The third receiving module 1001 is configured to receive a delivery instruction sent by the container body, and the delivery instruction includes order information of the target goods to be delivered.

The second delivering module 1002 is configured to deliver the target goods according to the order information when determining that the target goods are obtained.

In the related art, after a deliverer arrives at the destination, it can randomly hand over the goods to be delivered to any one of the delivery robots provided for the delivery site. However, if the delivery robots provided for the delivery site are all on the way to deliver goods when the deliverer arrives at the delivery site, the deliverer can only choose to wait or deliver the goods by itself, resulting in a reduction of the goods delivery efficiency of the deliverer.

Considering the above-mentioned defects, in this embodiment, a delivery robot dispatching apparatus is proposed. The apparatus can receive the delivery instruction sent by the container body, and the delivery instruction includes the order information of the target goods to be delivered. Then, the apparatus delivers the target goods according to the order information when determining the target goods are obtained. Since a plurality of goods to be delivered by the target delivery robot are stored in the container body, the apparatus can instruct the delivery robot to deliver them sequentially according to instructions from the container body. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

The order information included in the delivery instruction may also include the contact information of the consignee of the target goods, that is, a mobile phone number or a fixed phone number. After the apparatus delivers the target goods to the destination, it can contact the consignee through this contact information, so that the consignee can pick up the goods in time.

In the process of delivering the target goods, the apparatus can obtain the current location coordinates in real time through its own GPS module, and send location feedback information to the container body according to the obtained location coordinates, so that the container body can obtain the current location of the target delivery robot in real time. Alternatively, the apparatus may also send location feedback information to the container body according to the location request information sent by the container body.

The target delivery robot is provided with at least one goods storage bin, which can be used to store the target goods to be delivered.

In an optional implementation of this embodiment, the apparatus further includes a fourth receiving module 1004, and the fourth receiving module 1004 is configured to receive the target goods carried by a transfer module cooperating with the container body. Specifically, the third receiving module 1001 may open the door of the goods storage bin after receiving the delivery instruction sent by the container body. The container body can move the target goods to the goods storage bin through the transfer module. The fourth receiving module 1004 can receive the target goods carried by the transfer module cooperating with the container body, and when detecting that the goods storage bin is placed with goods, the second delivering module 1002 can close the goods storage bin and deliver the target goods according to the order information of the target goods.

This embodiment of the present disclosure provides a delivery robot dispatching apparatus. The container body can store goods to be delivered by the target delivery robot in the at least one receiving bin, and the apparatus can instruct the target delivery robot to sequentially deliver the to-be-delivered goods temporarily stored in the at least one receiving bin according to instructions from the container body. It avoids the situation that when the target delivery robot is busy, the deliverer needs to wait until the target delivery robot is idle so as to hand over the to-be-delivered goods to the target delivery robot, and thus the waiting time of the deliverer is shortened, and the goods delivery efficiency is improved.

Figure 11:
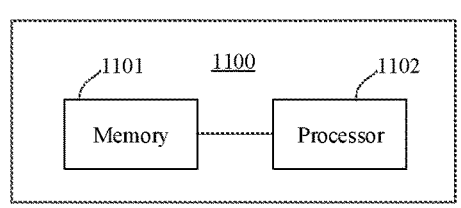
FIG. 11 shows a structural block diagram of an electronic device according to an embodiment of the present disclosure.

The present disclosure also discloses an electronic device. FIG. 11 shows a structural block diagram of an electronic device according to an embodiment of the present disclosure. As shown in FIG. 11, the electronic device 1100 includes a memory 1101 and a processor 1102; The memory 1101 is used to store one or more computer instructions, where the one or more computer instructions are executed by the processor 1102 to realize any method step on the container body side of the second embodiment or the fifth embodiment, or any method step on the target delivery robot side of the third embodiment or the sixth embodiment.

Figure 12:
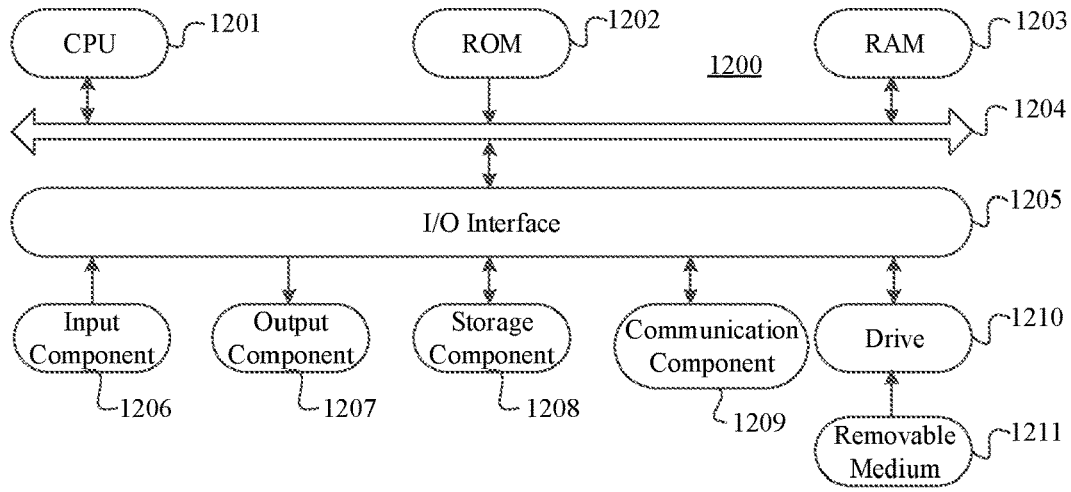
FIG. 12 is a schematic structural diagram of a computer system suitable for implementing a delivery robot dispatching method of the present disclosure.

FIG. 12 is a schematic structural diagram of a computer system suitable for implementing a delivery robot dispatching method on the container body side or a delivery robot dispatching method on the target delivery robot side according to an embodiment of the present disclosure.

As shown in FIG. 12, the computer system 1200 includes a central processing unit (CPU) 1201, which may perform various processes in the above-mentioned embodiment according to a program stored in a read-only memory (ROM) 1202 or a program loaded from a storage section 1208 to a random access memory (RAM) 1203. In RAM 1203, various programs and data necessary for the operation of the system 1200 are also stored. The CPU 1201, the ROM 1202, and the RAM 1203 are connected to each other through a bus 1204. An input/output (I/O) interface 1205 is also connected to the bus 1204.

The following components are connected to the I/O interface 1205: an input component 1206 including a keyboard, a mouse, etc.; an output component 1207 including a cathode ray tube (CRT), a liquid crystal display (LCD), etc., and speakers, etc.; a storage component 1208 including a hard drive, etc.; and a communication component 1209 including a network interface card such as a LAN card, a modem, etc. The communication component 1209 performs communication processing through a network such as the Internet. The drive 1210 is also connected to the I/O interface 1205 as needed. A removable medium 1211, such as a magnetic disk, an optical disk, a magneto-optical disk, and a semiconductor memory, is installed on the drive 1210 as needed, so that the computer program read therefrom is installed into the storage component 1208 as needed.

In particular, according to an embodiment of the present disclosure, the method described above in the second embodiment, the third embodiment, the fifth embodiment, and the sixth embodiment may be implemented as a computer software program. For example, the embodiments of the present disclosure include a computer program product, which includes a computer program tangibly contained on a readable medium thereof, and the computer program includes program code for executing the delivery robot dispatching method of the second embodiment, the third embodiment, the fifth embodiment, and the sixth embodiment. In such an embodiment, the computer program may be downloaded and installed from the network through the communication section 1209, and/or installed from the removable medium 1211.

The flowcharts and block diagrams in the drawings illustrate possible implementation architecture, a function, and an operation of a system, a method, and a computer program product according to various embodiments of the present disclosure. In this regard, each block in the route diagram or block diagram may represent a module, a program segment, or a part of the code, and the module, the program segment, or the part of the code contains one or more executable instructions for realizing the specified logical functions. It should also be noted that, in some alternative implementations, the functions noted in the blocks may occur in an order different from that noted in the drawings. For example, two blocks shown in succession can actually be executed in parallel, and sometimes they can also be executed in a reverse order, depending on the functions involved. It should also be noted that each block in the block diagrams and/or flowcharts, and combinations of blocks in the block diagrams and/or flowcharts, can be implemented with dedicated hardware-based systems that perform specified functions or operations, or a combination of dedicated hardware and computer instructions.

The units or modules involved in the described embodiments of the present disclosure may be implemented in software or hardware. The described units or modules may also be provided in the processor, and the names of these units or modules do not constitute a limitation on the units or modules themselves under certain circumstances.

As another aspect, the present disclosure also provides a computer-readable storage medium. The computer-readable storage medium may be the computer-readable storage medium included in the apparatus in the above-mentioned embodiment; or it may be a computer-readable storage medium that exists separately, not built into the apparatus. The computer-readable storage medium stores one or more programs, and the programs are used by one or more processors to execute the methods described in the present disclosure.

The above description is only some embodiments of the present disclosure and an explanation of the applied technical principles. Those skilled in the art should understand that the scope of the invention involved in this disclosure is not limited to a technical solution formed by a specific combination of the above technical features, but should also cover other technical solutions formed by any combination of the above technical features or their equivalents without departing from the inventive concept of the invention. For example, technical solutions formed by replacing the above features with the technical features having similar functions disclosed in (but not limited to) this disclosure.

What is claimed is:

1. An unmanned delivery device, wherein the unmanned delivery device comprises a container body, M delivery robots, and a transfer module, the M delivery robots and the transfer module are connected to the container body, the container body is provided with M cabinet groups respectively corresponding to the M delivery robots, the M is an integer greater than or equal to 1;

each of the cabinet groups is used for storing at least one goods to be delivered by a corresponding delivery robot;

the container body is configured to identify a target delivery robot, determine a target cabinet group corresponding to the target delivery robot, obtain order information of target goods stored in the target cabinet group, and send a delivery instruction to the target delivery robot according to the order information of the target goods, so that the target delivery robot delivers the target goods according to the order information after obtaining the target goods, wherein the order information comprises a delivery address of the target goods, and the target delivery robot is any one of the M delivery robots;

the transfer module is used for moving the target goods stored in the target cabinet group corresponding to the target delivery robot to the target delivery robot, wherein before obtaining the order information of the target goods stored in the target cabinet group, the container body is further configured to determine the target goods from to-be-delivered goods stored in at least one cabinet comprised in the target cabinet group, wherein determining the target goods from the to-be-delivered goods stored in the at least one cabinet comprised in the target cabinet group comprises: obtaining a storage time of to-be-delivered goods stored in each of the at least one cabinet comprised in the target cabinet group, wherein the storage time indicates a time of the to-be-delivered goods being stored in the cabinet; and determining the target goods currently to be delivered by the target delivery robot from the to-be-delivered goods stored in the at least one cabinet according to the storage time of the to-be-delivered goods stored in each of the at least one cabinet.

2. The unmanned delivery device of claim 1, wherein the container body is further provided with at least one receiving bin;

the receiving bin is used for temporarily storing the to-be-delivered goods;

the container body is configured to determine a delivery robot for delivering the to-be-delivered goods stored in the receiving bin;

the transfer module is further used for moving the to-be-delivered goods stored in the receiving bin to the cabinet group corresponding to the delivery robot for delivering the to-be-delivered goods.

3. The unmanned delivery device of claim 2, wherein the cabinet group comprises various cabinets for storing to-be-delivered goods with different characteristics, the characteristics comprise at least one of a transportation characteristic and a dimensional characteristic of the to-be-delivered goods;

the container body is further configured to determine a cabinet for storing the to-be-delivered goods from the cabinet group corresponding to the delivery robot for delivering the to-be-delivered goods according to the characteristic of the to-be-delivered goods stored in the receiving bin;

the transfer module is further used for moving the to-be-delivered goods stored in the receiving bin to the cabinet determined by the container body.

4. The unmanned delivery device of claim 1, wherein the target delivery robot is provided with a goods storage bin;

the transfer module is further used for moving the target goods stored in the target cabinet group to the goods storage bin of the target delivery robot.

5. The unmanned delivery device of claim 1 wherein determining the target goods from the to-be-delivered goods stored in the at least one cabinet comprised in the target cabinet group comprises:

obtaining a remaining delivery time of the to-be-delivered goods stored in each of the at least one cabinet comprised in the target cabinet group, wherein the remaining delivery time indicates a time difference from a current time to a scheduled delivery time of the to-be-delivered goods; and determining the target goods currently to be delivered by the target delivery robot from the to-be-delivered goods stored in the at least one cabinet according to the remaining delivery time of the to-be-delivered goods stored in each of the at least one cabinet.

6. The unmanned delivery device of claim 1, wherein before identifying the target delivery robot, the container body is further configured to:

obtain order information of a first to-be-delivered goods, and determine a first delivery robot for delivering the first to-be-delivered goods from the M delivery robots according to the order information of the first to-be-delivered goods;

move the first to-be-delivered goods to a first cabinet group corresponding to the first delivery robot for storage, and save a correspondence between the order information of the first to-be-delivered goods and the first cabinet group.

7. The unmanned delivery device of claim 6, wherein the cabinet group comprises various cabinets for storing to-be-delivered goods with different characteristics, and wherein the moving the first to-be-delivered goods to the first cabinet group corresponding to the first delivery robot for storage, and saving the correspondence between the order information of the first to-be-delivered goods and the first cabinet group comprises: the container body being further configured to:

determine a characteristic of the first to-be-delivered goods based on the order information of the first to-be-delivered goods, wherein the characteristic comprises a transportation characteristic or a dimensional characteristic of the first to-be-delivered goods;

determine a first cabinet for storing the first to-be-delivered goods from at least one cabinet comprised in the first cabinet group according to the characteristic of the first to-be-delivered goods;

move the first to-be-delivered goods to the first cabinet comprised in the first cabinet group for storage, and save a correspondence between the order information of the first to-be-delivered goods and the first cabinet.

8. The unmanned delivery device of claim 7, wherein the container body is further configured to:

begin to record a storage time of the first to-be-delivered goods being stored in the first cabinet when detecting that the first to-be-delivered goods are placed in the first cabinet.

9. The unmanned delivery device of claim 7, wherein the container body is further configured to:

obtain a remaining delivery time of the first to-be-delivered goods;

update the remaining delivery time of the first to-be-delivered goods in real time after detecting that the first to-be-delivered goods are placed in the first cabinet.

10. The unmanned delivery device of claim 6, wherein the container body is further provided with at least one receiving bin, and the receiving bin is used for temporarily storing the to-be-delivered goods; after obtaining the order information of the first to-be-delivered goods, the container body is further configured to:

determine a first receiving bin for temporarily storing the first to-be-delivered goods from the at least one receiving bin according to the order information of the first to-be-delivered goods; and after detecting that the first to-be-delivered goods are placed in the first receiving bin, performing the step of determining the first delivery robot for delivering the first to-be-delivered goods from the M delivery robots according to the order information of the first to-be-delivered goods.

* * * * *